United States Patent
Koike et al.

(10) Patent No.: US 11,256,089 B2
(45) Date of Patent: Feb. 22, 2022

(54) LENS ARRAY AND IMAGE PROJECTION DEVICE

(71) Applicant: NIPPON SEIKI CO., LTD., Niigata (JP)

(72) Inventors: Katsuhiro Koike, Kawagoe (JP); Takayuki Nomoto, Kawasaki (JP)

(73) Assignee: NIPPON SEIKI CO., LTD., Niigata (JP)

( * ) Notice: Subject to any disclaimer, the term of this patent is extended or adjusted under 35 U.S.C. 154(b) by 103 days.

(21) Appl. No.: 16/821,955

(22) Filed: Mar. 17, 2020

(65) Prior Publication Data

US 2020/0218070 A1 Jul. 9, 2020

Related U.S. Application Data

(62) Division of application No. 15/555,473, filed as application No. PCT/JP2015/056311 on Mar. 4, 2015, now Pat. No. 10,761,323.

(51) Int. Cl.
*G02B 27/01* (2006.01)
*G03B 21/625* (2014.01)
(Continued)

(52) U.S. Cl.
CPC ....... *G02B 27/0101* (2013.01); *G02B 3/0043* (2013.01); *G02B 27/0081* (2013.01);
(Continued)

(58) Field of Classification Search
CPC ............ G02B 27/0101; G02B 27/0081; G02B 3/0043; G02B 2027/0118;
(Continued)

(56) References Cited

U.S. PATENT DOCUMENTS

2006/0050016 A1 3/2006 Tomisawa et al.
2010/0118172 A1 5/2010 McCarten et al.
(Continued)

FOREIGN PATENT DOCUMENTS

JP 08-335043 A 12/1996
JP 2004-144873 A 5/2004
(Continued)

OTHER PUBLICATIONS

International Search Report and Written Opinion issued in International Patent Application No. PCT/JP2015/056311, dated Apr. 28, 2015, 7 pgs.
(Continued)

*Primary Examiner* — Kimberly N. Kakalec
(74) *Attorney, Agent, or Firm* — McDermott Will & Emery LLP

(57) ABSTRACT

There is provided a lens array and an lens array capable of suitably preventing irregular brightness without reducing resolution. A micro lens array of a screen includes upper-level microlenses and lower-level microlenses which are formed on the incidence surface of the screen, which have the same effective diameter, and which have a structure that generates an optical path length difference Δ in transmission light. By disposing the upper-level microlenses and the lower-level microlenses at an interval based on the effective diameter, the basic periodic structure of a lens period is formed. Further, the upper-level microlenses and the lower-level microlenses form a basic block comprising a combination of the lenses having a structure that generates the optical path length difference. A concave-and-convex period PC based on the basic block is an integer multiple of the lens period.

19 Claims, 19 Drawing Sheets

(51) Int. Cl.
  *G02B 3/00* (2006.01)
  *G02B 27/00* (2006.01)
  *G03B 21/14* (2006.01)
  *G03B 21/00* (2006.01)
  *G03B 21/20* (2006.01)

(52) U.S. Cl.
  CPC ......... *G03B 21/147* (2013.01); *G03B 21/625* (2013.01); *G02B 2027/0118* (2013.01); *G02B 2027/0145* (2013.01); *G03B 21/008* (2013.01); *G03B 21/2033* (2013.01)

(58) Field of Classification Search
  CPC .......... G02B 2027/0145; G02B 3/0037; G02B 3/005; G02B 3/0056; G02B 3/0062; G02B 3/0068; G02B 3/0075; G02B 3/0081; G02B 5/1814; G02B 5/1819; G02B 5/1842; G03B 21/625; G03B 21/147; G03B 21/2033; G03B 21/008
  See application file for complete search history.

(56) References Cited

U.S. PATENT DOCUMENTS

| | | |
|---|---|---|
| 2011/0284725 A1 | 11/2011 | Goldberg |
| 2013/0050655 A1 | 2/2013 | Fujikawa et al. |
| 2015/0103410 A1 | 4/2015 | Ando et al. |
| 2017/0235028 A1 | 8/2017 | Uchida |

FOREIGN PATENT DOCUMENTS

| | | | |
|---|---|---|---|
| JP | 2010-145745 A | 7/2010 | |
| JP | 2012-203089 A | 10/2012 | |
| JP | 2013-064985 A | 4/2013 | |
| JP | 2013-250336 A | 12/2013 | |
| WO | WO-2015011913 A1 * | 1/2015 | ............... G02B 5/02 |

OTHER PUBLICATIONS

Non-Final Office Action issued in related parent U.S. Appl. No. 15/555,473, dated Nov. 12, 2019.

* cited by examiner

PITCH OF DIFFRACTED LIGHTS IS SMALL

PITCH OF DIFFRACTED LIGHTS IS MEDIUM

PITCH OF DIFFRACTED LIGHTS IS LARGE

FIG. 9A
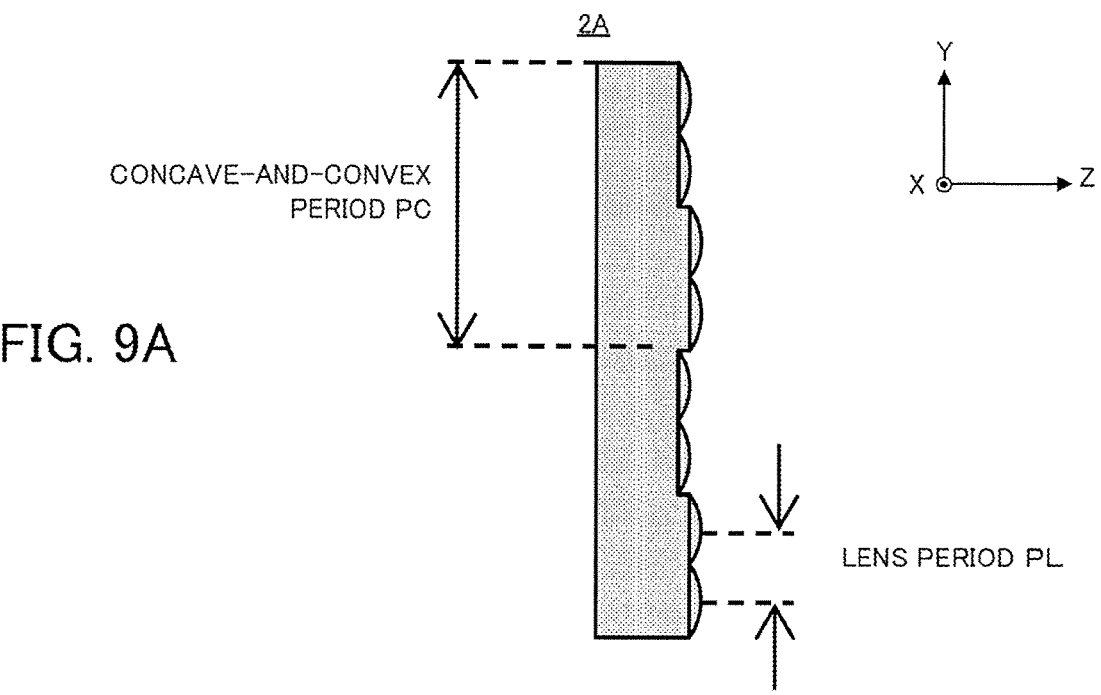
FIG. 9B
FIG. 9C
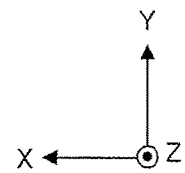

FIG. 16A
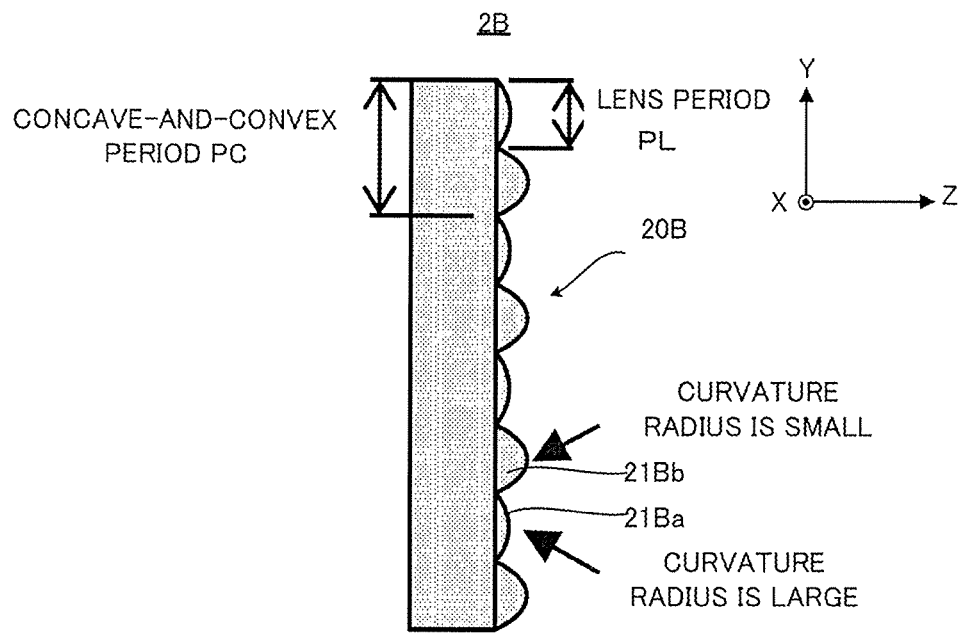
FIG. 16B
FIG. 16C
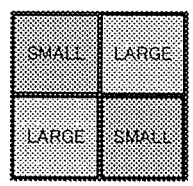

LENS ARRAY AND IMAGE PROJECTION DEVICE

CROSS-REFERENCE TO RELATED APPLICATIONS

This application is a Divisional of U.S. patent application Ser. No. 15/555,473, filed on Sep. 1, 2017, which is the U.S. National Phase under 35 U.S.C. § 371 of International Application No. PCT/JP2015/056311, filed on Mar. 4, 2015, the entire contents of each are hereby incorporated by reference.

TECHNICAL FIELD

The present invention relates to a display system including a lens array capable of improving visibility.

BACKGROUND TECHNIQUE

Conventionally, there is proposed a technique for applying a transmission-type screen equipped with a microlens array to a head-up display and a laser projector. Using such a transmission-type screen is more preferable than using a diffuser panel because an influence caused by the speckle noise can be suppressed. For example, in Patent Reference-1, there is proposed an image forming device including a laser projector and a microlens array on which plural microlenses are arranged. In Patent Reference-2, there is proposed a technique of determining the pitch of each microlens so that the width of the diffraction of beam diffused by each microlens of a microlens array is equal to or shorter than the pupil diameter of the observer thereby to prevent the irregular brightness due to the uncertainty that the peak of the diffracted light diffused at the microlens enters the pupils of an observer.

PRIOR ART REFERENCE

Patent Reference

Patent Reference-1: Japanese Patent Application Laid-open under No. 2010-145745
Patent Reference-2: Japanese Patent Application Laid-open under No. 2013-064985

DISCLOSURE OF INVENTION

Problem to be Solved by the Invention

When a lens array is used for ahead-up display as an element for generating an intermediate image, determining a small pitch of the lens array could lead to irregular brightness whereas determining a large pitch of the lens array could lead to the resolution degradation. Patent Reference-1 does not disclose how to suppress the irregular brightness. In contrast, according to Patent Reference-2, since the pitch of the lens array is expanded, the resolution of the intermediate image generated at the lens array deteriorates.

The present invention has been achieved in order to solve the above problem. It is an object of the present invention to provide a lens array and an image projection device capable of suitably suppress the irregular brightness without deteriorating the resolution.

Means for Solving the Problem

One invention is a lens array including plural lenses configured to have the same effective diameter and to have a structure that generates an optical path length difference in transmission light or reflective light, wherein each of the plural lenses is arranged at an interval based on the effective diameter thereby to form a two-dimensional basic periodic structure, wherein a part of the plural lenses form a basic block which is a combination of lenses having the structure that generates the optical path length difference, wherein the basic block is repeatedly arranged to form a two-dimensional secondary periodic structure whose period is longer than the period of the basic periodic structure, and wherein the period of the secondary periodic structure is an integer multiple of the period of the basic periodic structure.

BRIEF DESCRIPTION OF THE DRAWINGS

FIGS. 9A to 9C illustrate the configuration of the screen according to the first modification.
FIGS. 16A to 16C illustrate the configuration of the screen according to the third modification.

DETAILED DESCRIPTION OF THE PREFERRED EMBODIMENTS

Figure 1A:
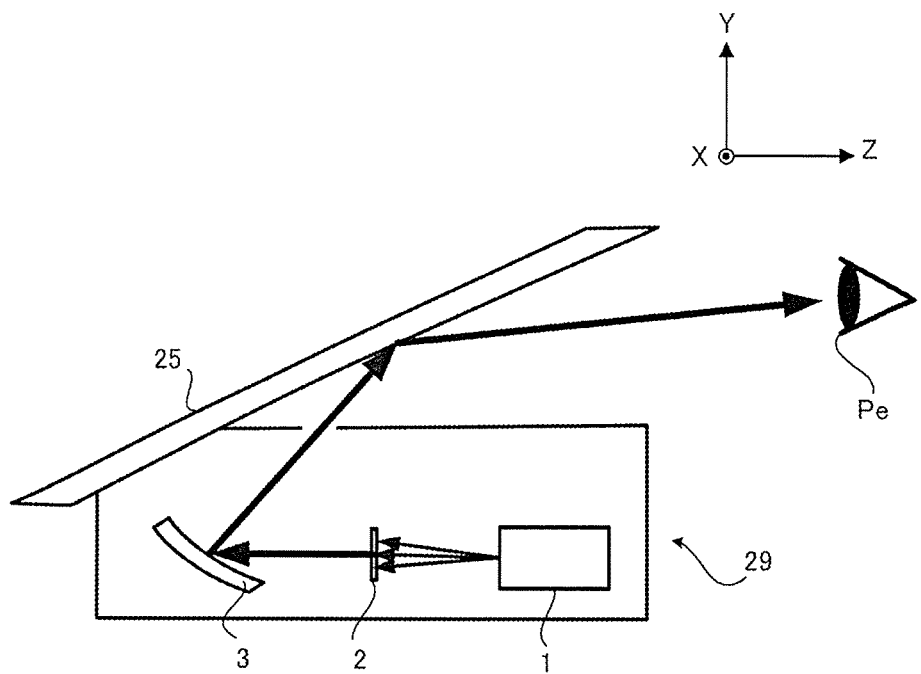
FIGS. 1A and 1B illustrate schematic configurations of head-up displays.

According to a preferable embodiment of the present invention, there is provided a lens array including plural lenses configured to have the same effective diameter and to have a structure that generates an optical path length difference in transmission light or reflective light, wherein each of the plural lenses is arranged at an interval based on the effective diameter thereby to form a two-dimensional basic periodic structure, wherein a part of the plural lenses form a basic block which is a combination of lenses having the structure that generates the optical path length difference, wherein the basic block is repeatedly arranged to form a two-dimensional secondary periodic structure whose period is longer than the period of the basic periodic structure, and wherein the period of the secondary periodic structure is an integer multiple of the period of the basic periodic structure.

The lens array includes plural lenses configured to have the same effective diameter and to have a structure that generates an optical path length difference in transmission light or reflective light. Each of the plural lenses is arranged at an interval based on the effective diameter thereby to form a two-dimensional basic periodic structure. Some lenses of the plural lenses form a basic block which is a combination of lenses having the structure that generates the optical path length difference. The basic block is repeatedly arranged to form a two-dimensional secondary periodic structure whose period is longer than the period of the basic periodic structure. The period of the secondary periodic structure is an integer multiple of the period of the basic periodic structure.

By having the secondary periodic structure whose period is an integer multiple of the period of the basic periodic structure based on the arrangement of the lenses, the above lens array diffuses diffracted lights so that any clearance of the light intensity distribution at the view point is filled. Thus, in this mode, the lens array can suitably suppress the irregular brightness while preventing the resolution from deteriorating due to the difference of effective diameters of the lenses.

In one mode of the lens array, the basic block is formed by the part of the plural lenses combined in a grid pattern and has a staggered arrangement thereof with respect to each different structure. According to this mode, the lens array can generate first order diffracted lights in the diagonal direction of each 0th order diffracted light to effectively fill the clearance of the light intensity distribution of diffracted lights. Thus, it is possible to suitably suppress the irregular brightness.

In another mode of the lens array, the period of the secondary periodic structure is four times as long as the period of the basic periodic structure. This mode enables the first order diffracted lights generated through the secondary periodic structure not to overlap with each other at the same position thereby to suppress the irregular brightness.

In still another mode of the lens array, the basic block is formed by the part of the plural lenses combined in a grid pattern and configured of a combination of at least three kinds of lenses which generates the optical path length difference. Even in this mode, it is possible to form the secondary periodic structure whose period is an integer multiple of the period of the basic periodic structure based on the arrangement of the lenses.

In still another mode of the lens array, the plural lenses have the same curvature and are arranged with a height difference to generate the optical path length difference. The lenses of the lens array according to this mode can suitably generate the optical path length difference in the transmission light.

In still another mode of the lens array, the optical path length difference is determined to meet a condition that the diffraction efficiency of the 0th order diffracted light of the lens array is substantially equal to the diffraction efficiency of the first order diffracted lights of the lens array. The lens array according to this mode can generate each 0th order diffracted light and its positive and negative first order diffracted lights with the same intensity thereby to fill the clearance of the light intensity distribution at the view point.

In still another mode of the lens array, the optical path length difference is determined to meet a condition that the diffraction efficiency of the 0th order diffracted light of the light intensity distributions substantially zero. The lens array according to this mode evenly fill the clearance of the light intensity distribution at the viewpoint by the positive and negative first order diffracted lights.

In still another mode of the lens array, the optical path length difference is determined to be the shortest length or the second shortest length out of lengths which meet the condition. The longer the optical path length difference is, the larger the variation of the diffraction efficiency along with the variation of the wavelength becomes. The lens array according to this mode can suitably suppress the ratio of the diffraction efficiency of diffracted light(s) per each order from highly depending on the wavelength even when the synthesized light with plural wavelengths enters the lens array.

In a preferable example of the lens array, the lens array is irradiated by a laser light emitted by an image projection device equipped with at least one laser light source.

In still another mode of the lens array, the optical path length difference is determined based on the longest wavelength out of the wavelengths of laser lights emitted by the at least one laser light source. Generally, the longer the wavelength is, the longer the pitch of the diffracted light becomes. Thus, the lens array according to this mode can fill the clearance of the light intensity distribution at the view point regarding all wavelengths of light.

In still another mode of the lens array, the optical path length difference is determined based on the wavelength with the highest luminous sensitivity out of the wavelengths of laser lights emitted by the at least one laser light source. Even in this mode, the lens array can suitably suppress the irregular brightness.

In still another mode of the lens array, the optical path length difference is determined based on a wavelength between the longest wavelength and the wavelength with the highest luminous sensitivity out of the wavelengths of laser lights emitted by the at least one laser light source. Even in this mode, the lens array can suitably suppress the irregular brightness.

In a preferable example of the lens array, the numerical apertures of the plural lenses are substantially equal.

In still another mode of the lens array, the plural lenses generate the optical path length difference based on a curvature difference. Even in this mode, the lens array can suitably generate the optical path length difference in the transmission light.

In still another mode of the lens array, the plural lenses generate the optical path length difference based on a difference of signs of curvatures thereof. Even in this mode, the lens array can suitably generate the optical path length difference in the transmission light. Preferably, the above lens array is mounted on an image projection device.

In still another mode of the lens array, the lens array is a reflective lens array with a lens array surface on which a reflection coating is applied. Even in this mode, the lens array can suitably suppress the irregular brightness while preventing the resolution from deteriorating due to the difference of effective diameters of the lenses thereof.

Embodiment

A preferred embodiment of the present invention will be explained hereinafter with reference to the drawings.

[Configuration of Head-Up Display]

FIG. 1A illustrates schematic configuration of a head-up display which is an example of the "image projection device" according to the present invention. The head-up display is a system which lets a person inside a vehicle equipped with a windshield 25 and a dashboard 29 visually recognize a virtual image, and includes a light source unit 1, a screen 2, and a concave mirror 3.

The light source unit 1 includes laser devices corresponding to red (R), green (G) and blue (B), and scans the screen 2 through a MEMS mirror by synthesized laser light modulated based on image signals.

The screen 2 enlarges the exit pupil by expanding the divergence angle of light emitted by the light source unit 1. The screen 2 is a mirolens array in which plural microlenses are arranged. The light emitted by the light source unit 1 enters the concave mirror 3. As mentioned later, a phase structure whose period is larger than the period of the microlenses is incorporated into the screen 2. Thereby, the screen 2 simultaneously generates plural diffracted lights whose diffraction angles are each smaller than the diffraction angle of a diffracted light generated by the microlens array. The screen 2 is an example of the "transparent substrate" according to the present invention. Hereinafter, the lateral direction of the intermediate image generated by the screen 2 is defined as "X axis", the longitudinal direction thereof is defined as "Y axis", the direction perpendicular to an incident plane of the screen 2 is defined as "Z axis", and each positive direction thereof is defined as illustrated in the drawings.

The concave mirror 3 reflects the laser light projected from the screen 2 thereby to lead the light to the windshield 25. In this case, by reflecting the laser light, the concave mirror 3 enlarges the image corresponding to the laser light. The laser light reflected by the concave mirror 3 is further reflected by the windshield 25 to reach the eyes of an observer. Thereby, the observer visually recognizes the virtual image.

It is noted that the configuration of the head-up display illustrated in FIG. 1A is merely one example, and the configuration to which the present invention can be applied is not limited to the configuration. For example, in the case of the head-up display illustrated in FIG. 1B, the screen 2 includes reflective microlenses. Then, through the reflective microlenses, the head-up display may enlarge the pupil exit by expanding the divergence angle of the light emitted by the light source unit 1. In another example, the head-up display is equipped with a combiner between the windshield 25 and the eye point Pe and lets the combiner reflect the laser light reflected by the concave mirror 3. Thereby, the head-up display leads the laser light of the light source unit 1 to the eye point Pe thereby to let the driver visually recognize the virtual image.

[Screen]

(1) Schematic Configuration of Screen

Figure 2:
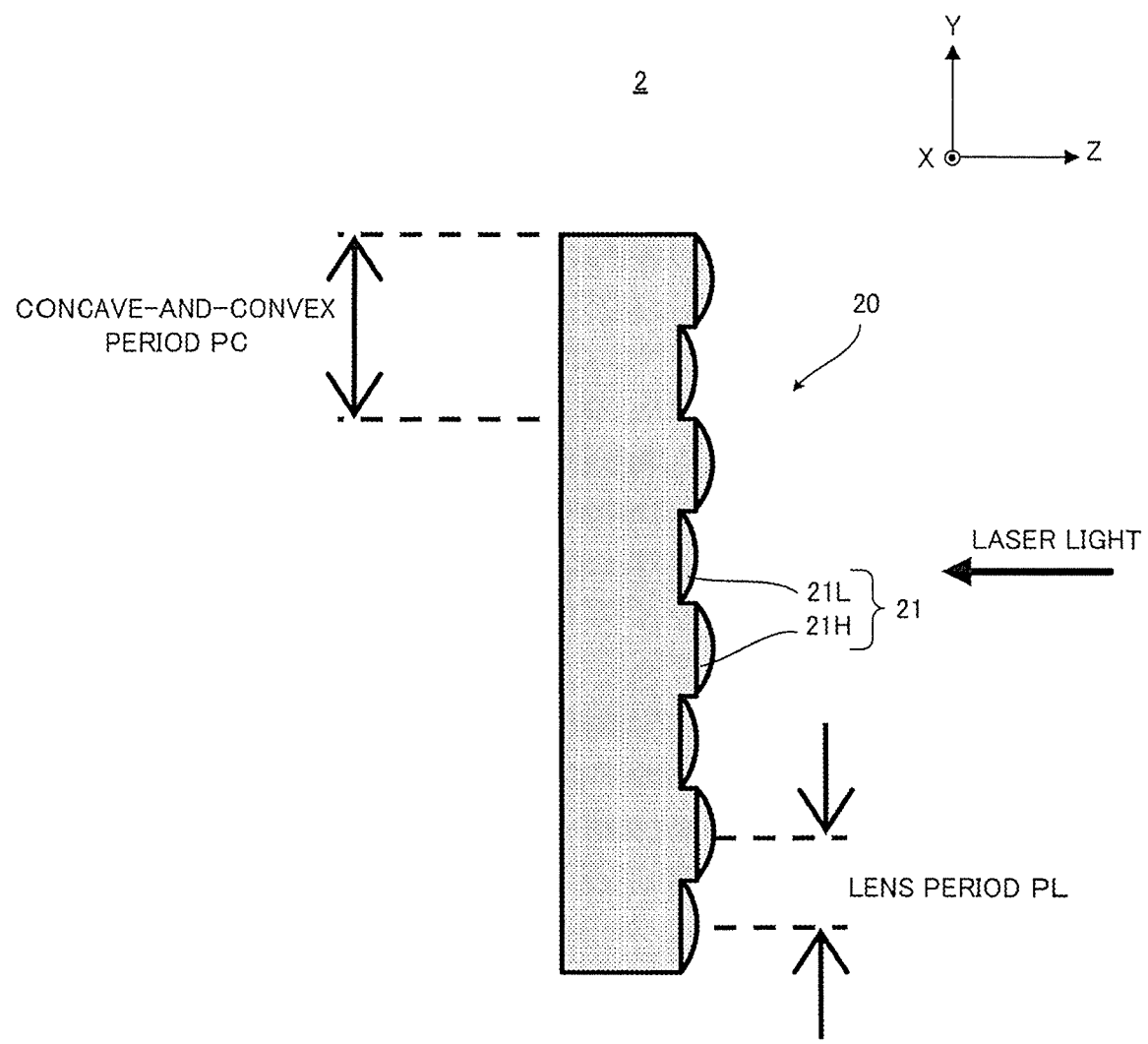
FIG. 2 illustrates a side view of a screen in the Y-Z plane.

FIG. 2 illustrates a side view of the screen 2 in the Y-Z plane. As illustrated in FIG. 2, on the incident plane of the screen 2 on which the light of the light source unit 1 is incident, there is formed a microlens array 20 in which the microlenses 21 (21H, 21L) with different heights in the Z axis direction are alternatively arranged. Here, the top position of an upper level microlens 21H is higher in the Z axis direction than the top position of a lower level microlens 21L, and there is formed a height difference between the upper level microlens 21H and the neighboring lower level microlens 21L. It is noted that the effective diameters and numerical apertures of all the microlenses 21 are equal regardless of whether each of them is an upper level microlens 21H or a lower level microlens 21L. As illustrated in FIG. 2, the period (referred to as "concave-and-convex period PC") of a pair of a concave and a convex formed by an upper level microlens 21H and a lower level microlens 21L is twice, that is an integer multiple, as long as the period (referred to as "lens period PL") of the microlenses 21.

Figure 3A:
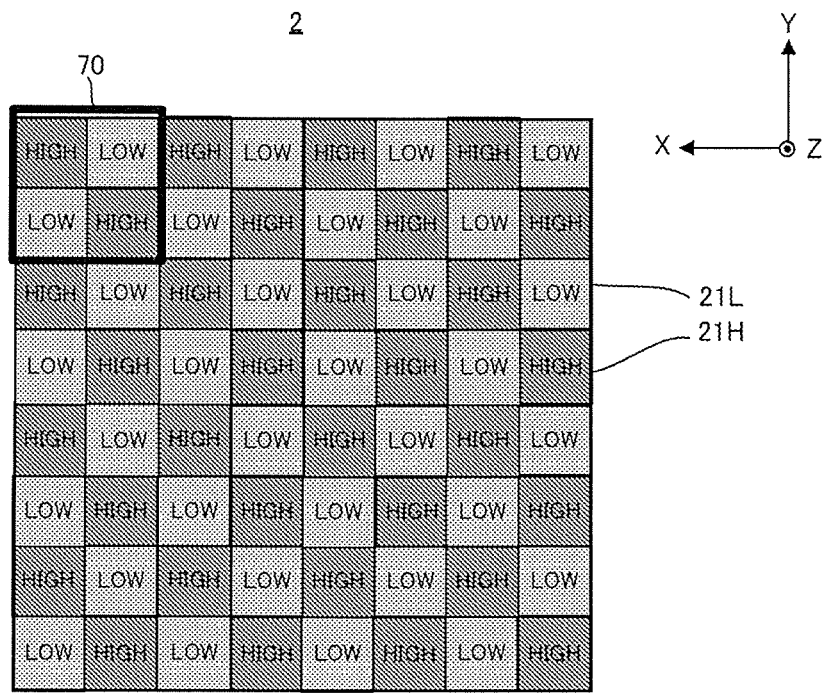
FIGS. 3A to 3C illustrate a configuration of a microlens array.

FIG. 3A illustrates the height of the incident plane of the screen 2. In FIG. 3A, rectangle areas with notations "HIGH" correspond to upper level microlenses 21H, and rectangle areas with notations "LOW" correspond to lower level microlenses 21L.

As illustrated in FIG. 3A, an upper level microlens 21H and a lower level microlens 21L are alternatively arranged one by one in the X axis direction and in the Y axis direction, and they are asymmetric with respect to the X axis and the Y axis. A rectangle area (e.g., the area in the frame 70) where two upper level microlens 21H and two lower level microlens 21L are arranged in zigzag (i.e., in a staggered arrangement) forms a unit structure (referred to as "basic block") of the periodical phase structure of the microlens array 20. Each of the microlenses 21 functions as the "basic periodical structure" and the basic block functions as the "secondary periodical structure" according to the present invention.

Figure 3B:
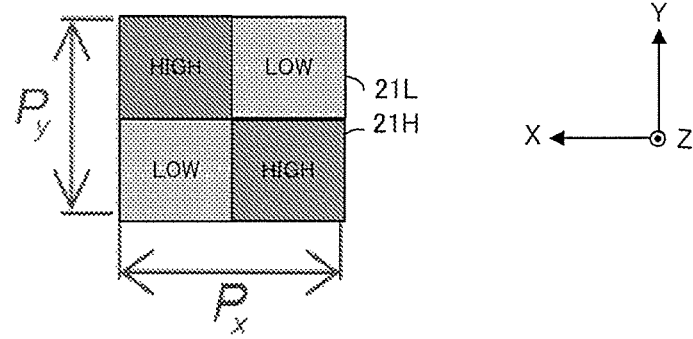
Figure 3C:
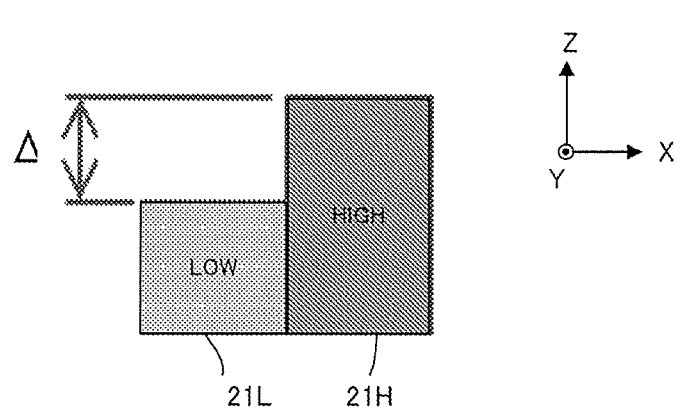

FIG. 3B illustrates an enlarged view of the basic block of the microlens array 20 and FIG. 3C illustrates the height difference between a lower level microlens 21L and an upper level microlens 21H in the Z axis direction. As illustrated in FIG. 3B, the basic block is quartered in a cross shape, and diagonally-arranged areas have the same structure and areas adjacent to each other have different structures. In other words, the basic block is symmetric with respect to the center position and areas with the same structure are arranged in zigzag. Hereinafter, the width of the basic block in the X axis direction is referred to as "Px", and the width thereof in the Y axis direction is referred to as "Py". In this case, given that the diffraction order in the X axis direction is referred to as "m" and that the diffraction order in the Y axis direction is referred to as "n", the diffraction angle "θx", in the X axis direction, of the light which enters the basic block and which has a wavelength "λ" is expressed through general optical calculations as $$\sin(\theta x) = \frac{m\lambda}{Px}, \quad (1)$$

and the diffraction angle "θy", in the Y axis direction, of the light which enters the basic block is expressed as $$\sin(\theta y) = \frac{n\lambda}{Py}. \quad (2)$$

Additionally, as illustrated in FIG. 3B, the height difference in the Z axis direction between the lower level microlens 21L and the upper level microlens 21H is referred to as "Δ". Then, the optical path length difference, which is caused by the height difference, between the light passing through the upper level microlens 21H and the light passing through the lower level microlens 21L is "Δ", which is the same distance as the height difference. Hereinafter, "Δ" is used as "height difference Δ" or "optical path length difference Δ".

(2) Examples of Light Intensity Distribution

Next, with reference to FIGS. 4A to 4E and FIGS. 5A to 5D, a description will be given of examples of light intensity distributions of diffracted lights generated by each microlense 21 of the screen 2.

Figure 4A:
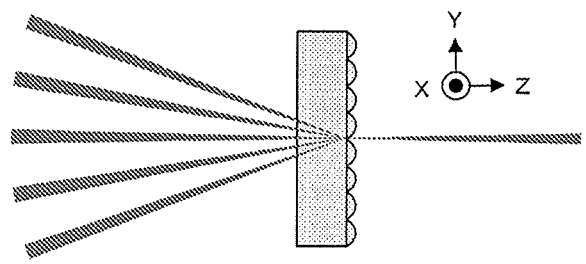
FIGS. 4A to 4E illustrate diffracted lights of the screen on the Y-Z plane.
Figure 5A:
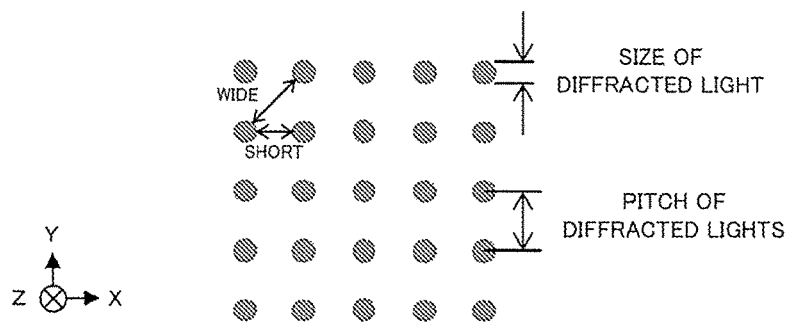
FIGS. 5A to 5D illustrate light intensity distributions of the diffracted light.

FIG. 4A illustrates diffracted lights in the Y-Z plane on the assumption that the height reference Δ is not provided on the microlens array 20 (i.e., only the lens array component is considered). FIG. 5A illustrates a light intensity distribution of the diffracted lights on a virtual X-Y plane (referred to as "standard plane Ptag") which is away from the screen 2 by substantially the same distance as the eye point Pe in the case of FIG. 4A.

In this case, as illustrated in FIG. 5A, the diameter (referred to as "diffracted light size") of each diffracted light on the standard plane Ptag is shorter than the pitch (referred to as "diffracted light pitch") of each diffracted light on the standard plane Ptag, and therefore there is clearance between diffracted lights adjacent to each other. The clearance leads to irregular brightness. It is noted that, as illustrated in FIG. 5A, the diffracted light pitch in the diagonal direction is larger than the diffracted light pitch in the X axis direction and in the Y axis direction.

Figure 4B:
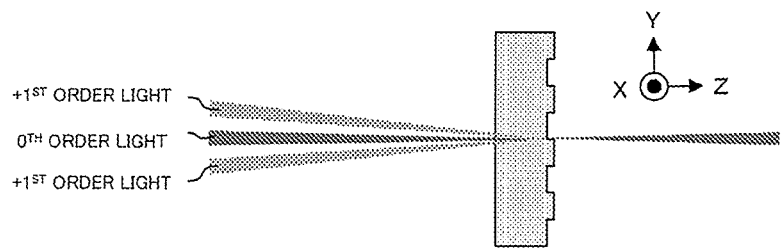
Figure 4C:
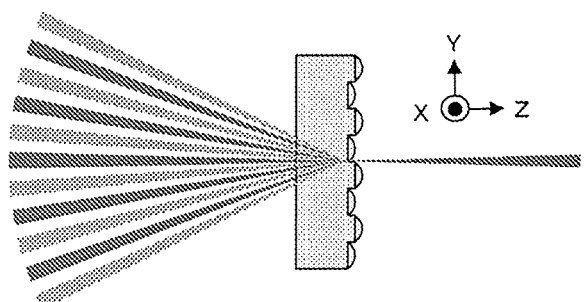
Figure 4D:
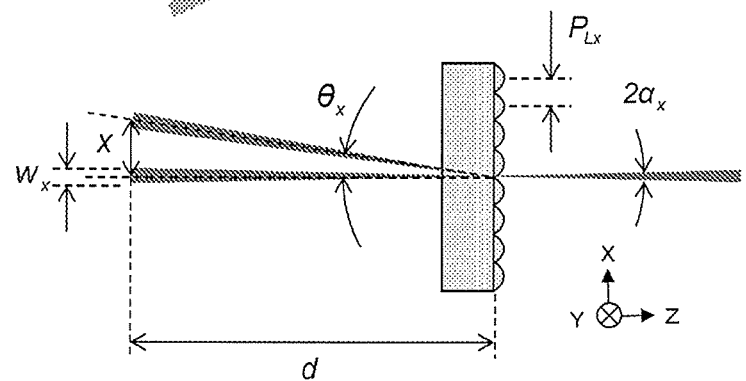

FIG. 4D illustrates the diffracted lights on the X-Z plane on the assumption that there is no height difference Δ on the microlens array 20. The relationship between the pitch "$P_{Lx}$" of the microlenses 21 in the X axis direction and the diffraction angle "θx" of the first order diffraction lights in the X axis direction is expressed as the following equation.

$$\sin\theta_x = \frac{\lambda}{P_{Lx}} \quad (3)$$

Figure 4E:
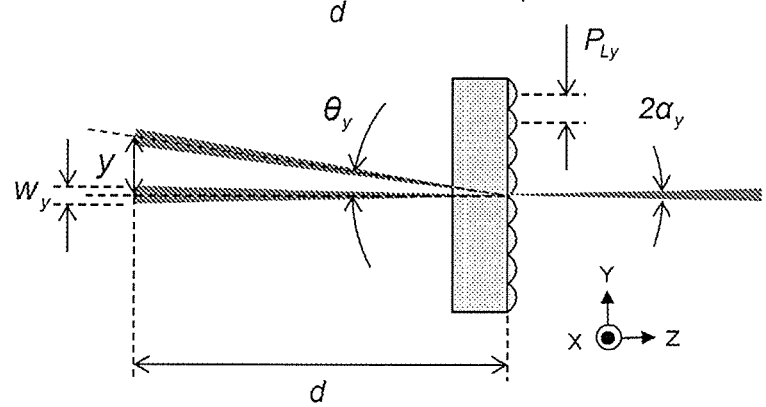

FIG. 4E illustrates the diffracted lights on the Y-Z plane on the assumption that there is no height difference Δ in the microlens array 20. The relationship between the pitch "$P_{Ly}$" of the microlenses 21 in the Y axis direction and the diffraction angle "θy" is expressed as the following equation.

$$\sin\theta_y = \frac{\lambda}{P_{Ly}} \quad (4)$$

Thus, the pitch "x" of the diffracted lights in the X axis direction on a virtual X-Y plane which is away from the microlens toward negative Z direction by distance "d" is expressed by the following equation.

$$x = d \times \sin\theta_x \quad (5)$$

Similarly, the pitch "y" of the diffracted lights in the Y axis direction on a virtual X-Y plane which is away from the microlens toward negative Z direction by distance "d" is expressed by the following equation.

$$y = d \times \sin\theta_y \quad (6)$$

Furthermore, when the total angle of the converging angle of the light converging on the microlens array 20 from the light source unit 1 is referred to as "2α", the beam size "w" at the view point is expressed as the following equation.

$$w = 2 \times d \times \sin\alpha \quad (7)$$

It is noted that the total angle "2α" and the beam size "w" at the view point may be calculated from the outline of the beam which can be geometrically calculated. In this case, if the light intensity distribution of the laser beam is a Gaussian distribution and the full width at half maximum of the light intensity distribution at the view point is smaller than the outline of the beam which can be geometrically calculated, the total angle "2α" of the converging angle may be considered as the total angle of the converging angle corresponding to the full width at half maximum of the intensity distribution of the laser beam and the beam size "w" may be also considered as the full width at half maximum of the intensity distribution of the beam at the view point.

Figure 5B:
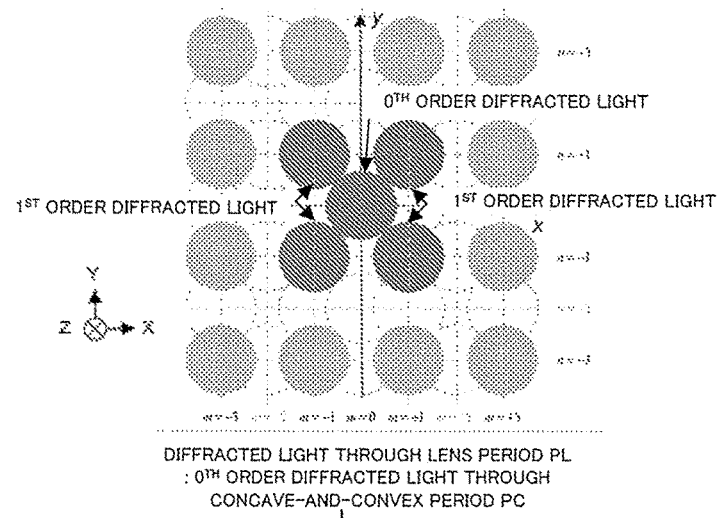
Figure 5C:
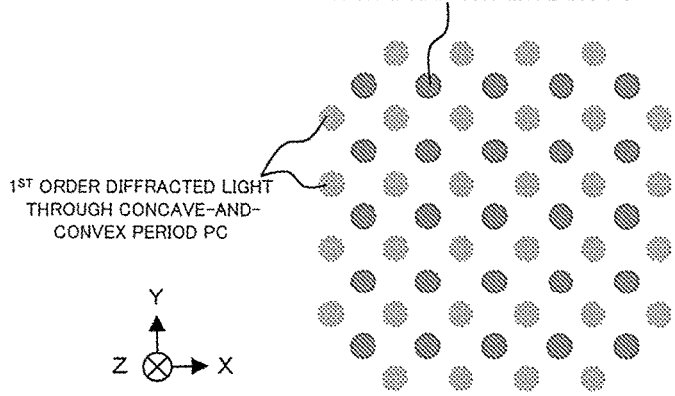
Figure 5D:
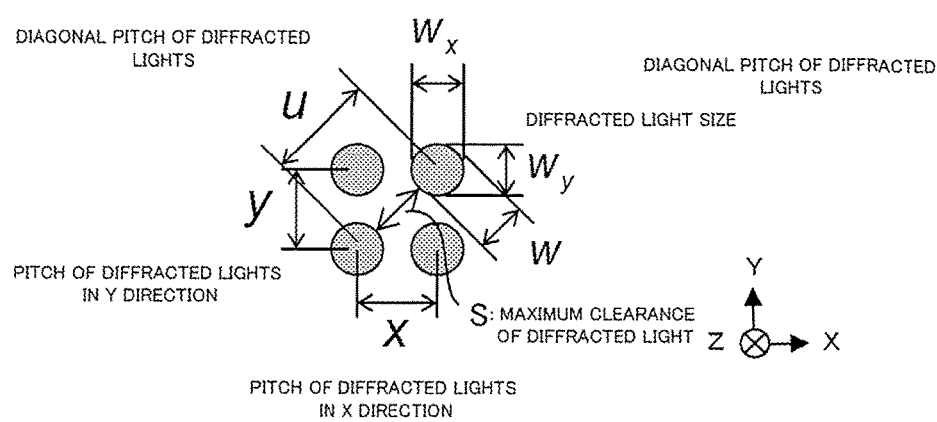

FIG. 5D illustrates the light intensity distribution of the diffracted lights on the virtual X-Y plane which is away from the screen 2 by the distance d in the case of FIG. 4D and FIG. 4E. With reference to FIG. 5D, the peak of the pitch (interval) of the diffracted lights on the virtual X-Y plane is the pitch between the diffracted lights diagonally facing each other, and the pitch "u" of the diffracted lights is expressed as the following equation.

$$u = \sqrt{x^2 + y^2} \quad (8)$$

In this case, the clearance "s" between the diffracted lights diagonally facing each other is expressed as the following equation by using "w" which indicates the beam size in the diagonal direction.

$$s = u - W \quad (9)$$

Furthermore, given that "2α" indicates the total angle of the converging angle of the laser beam in the diagonal direction and that the equations (3), (4), (5), (6) and (7) are substituted into the equation (9), the maximum clearance s of the diffracted lights is expressed as the following equation.

$$s = d \times \left\{ \sqrt{\left(\frac{\lambda}{P_{Lx}}\right)^2 + \left(\frac{\lambda}{P_{Ly}}\right)^2} - 2 \times \sin\alpha \right\} \quad (10)$$

When the above value meets the following condition $$s \geq 0 \quad (11),$$

i.e., when the following condition $$\sin\alpha \leq \frac{\lambda}{2} \sqrt{\left(\frac{1}{P_{Lx}}\right)^2 + \left(\frac{1}{P_{Ly}}\right)^2} \quad (12)$$

is satisfied, areas without any overlap with light occurs between neighboring diffracted lights on the virtual X-Y plane. This leads to serious irregular brightness. Namely, on the assumption that the height difference Δ is not provided on the microlens array 20, the irregular brightness becomes serious when the converging angle α of the light projected from the light source unit 1 is small or when the pitch of the microlenses 21 is small.

FIG. 4B illustrates the diffracted lights on the Y-Z plane in such a case that only the height difference component of the microlens array 20 is considered. FIG. SB illustrates the light intensity distribution of the diffracted lights on the standard plane Ptag in the case of FIG. 4B. In the case of the example illustrated in FIG. 4B and FIG. 5B, the height difference (optical path length difference) Δ is set to "(N±0.283) λ" ("N" is an integer which is equal to or larger than 0).

In this case, as illustrated in FIG. 5B, the diffracted light (referred to as "0th order diffracted light") whose order m and order n are both "0" and the diffracted lights (referred to as "first order diffracted lights") whose order m and order n are both "±1" arise with the same intensity, while any diffracted light ("even order diffracted light") whose order m and/or order n is even other than 0 does not arise. The higher the order is, the lower the intensity of the diffracted light becomes. These theoretical grounds will be described in detail at the section "(3) Analysis of Diffraction Efficiency". Further, as described later, by adjusting the optical path length difference Δ, it is possible to adjust the distribution of the diffraction efficiency of the 0th order light and the first order lights.

FIG. 4C illustrates the diffracted lights on the Y-Z plane of the microlens array 20 in such a case that the component indicated by FIG. 4A and the component indicated by the FIG. 4B are combined. FIG. 5C illustrates the light intensity distribution of the diffracted lights on the standard plane Ptag in the case of FIG. 4C. For the sake of visibility, the 0th order diffracted lights in FIG. 5C are described darker than the first order diffracted lights.

As illustrated in FIG. 5C, in this case, on the standard plane Ptag, the 0th order diffracted lights corresponding to the distribution of the diffracted lights illustrated in FIG. 5A are distributed while the first order diffracted lights are arranged in every four diagonal directions with respect to each 0th order diffracted light. Namely, in this case, compared to the example of no height difference illustrated in FIG. 4A and FIG. 5A, the first order diffracted lights are inserted into each diagonal clearance where the diffracted light pitch is at its maximum. Thus, in this case, it is possible to efficiently fill the clearance between the diffracted lights with a few diffracted lights.

Additionally, since the concave-and-convex period PC is determined to be an integer multiple (twice in this case) of the lens period PL, the diffracted lights are orderly arranged on the standard plane Ptag. Thus, the light intensity distribution at the view point comes close to an even distribution. Generally, in such a case that plural periodical structures whose periods of periodical structures are different are combined, moire fringes arises due to the difference of the periods. Additionally, even when periodical structures with the same period or with integer multiple period are combined, a shift of the positional relationship leads to moire fringes. In contrast, according to the embodiment, since the concave-and-convex period PC which is an integer multiple of the lens period PL is incorporated, the unconformity between the period of the individual microlens 21 and the incorporated integer multiple period thereof does not arise. Thus, according to embodiment, it is possible to prevent the occurrence of moire fringes.

(3) Analysis of Diffraction Efficiency

Next, a description will be given of the diffraction efficiency of diffracted lights on the screen 2. The diffraction efficiency "I(m, n)" of a transparent light with the wavelength λ passing through the phase structure including basic block illustrated in FIG. 3B is expressed with reference to Px, Py, Δ illustrated in FIG. 3B as the following general equation (13).

$$I_{m,n} = \left| \frac{1}{P_x \cdot P_y} \int_0^{P_x} \int_0^{P_y} A(x, y) \exp \right. \quad (13)$$

-continued
$$\left. \{i \cdot 2\pi \cdot \phi(x, y)\} \cdot \exp\left\{-i \cdot 2\pi\left(\frac{m}{P_x} \cdot x + \frac{n}{P_y} \cdot y\right)\right\} dxdy \right|^2$$

Here, "A(x, y)" indicates an intensity distribution and "φ(x,y)" indicates a phase distribution (i.e., distribution of optical path length differences) in one period, and they are expressed as the following equations (14) and (15).

$$A(x, y) = 1 \quad (14)$$

$$\phi(x, y) = \begin{cases} 0 & \dots \ (0 \le x < 0.5 \cdot P_x \ \& \ 0 \le y < 0.5 \cdot P_y) \\ \Delta & \dots \ (0.5 \cdot P_x \le x < 1 \cdot P_x \ \& \ 0 \le y < 0.5 \cdot P_y) \\ 0 & \dots \ (0 \le x < 0.5 \cdot P_x \ \& \ 0.5 \cdot P_y \le y < 1 \cdot P_y) \\ \Delta & \dots \ (0.5 \cdot P_x \le x < 1 \cdot P_x \ \& \ 0.5 \cdot P_y \le y < 1 \cdot P_y) \end{cases} \quad (15)$$

When A(x, y) indicated by the equation (14) and φ(x, y) indicated by the equation (15) are substituted into the diffraction efficiency I(m, n) indicated by the equation (13), the following equation (16) is obtained.

$$I(m, n) = \left| \frac{\sin(\pi m)}{\pi m} \frac{\sin(\pi n)}{\pi n} - \frac{1}{2}\left[1 - \exp\left(i\frac{2\pi}{\lambda}\Delta\right)\right] \right. \quad (16)$$
$$\left. \left\{ \frac{\sin(\pi m)}{\pi m} \frac{\sin(\pi n)}{\pi n} + \frac{1 - \cos(\pi m)}{(\pi m)} \frac{1 - \cos(\pi n)}{(\pi n)} \right\} \right|^2$$

Regarding the equation (16), the values of the following member (two occurances in the equation 16)

$$\frac{\sin(\pi m)}{\pi m} \frac{\sin(\pi n)}{\pi n}$$

are "1" only when "m=0" and "n=0" are satisfied, and the values is "0" in the other cases. The values of the following member $$1 - \exp\left(i\frac{2\pi}{\lambda}\Delta\right)$$

vary from 0 to 1 with the period λ with respect to the light path difference Δ. The value of the following member $$\frac{1 - \cos(\pi m)}{\pi m} \frac{1 - \cos(\pi n)}{\pi n}$$

is "0" if "m" and/or "n" are even, and the absolute value of the member with the above term decreases with increasing the absolute values of "m" and "n".

The diffraction efficiency of the 0th order diffracted light is obtained through substitutions of "m=0" and "n=0" into the equation (16) and expressed as the following equation (17).

$$I(0, 0) = \frac{1}{2}\left\{1 + \cos\left(\frac{2\pi}{\lambda}\Delta\right)\right\} \quad (17)$$

Similarly, the diffraction efficiency of the first order diffracted light is obtained and expressed through substitutions of "m, n=±1" into the equation (16) as the following equation (18).

$$I(\pm 1, \pm 1) = \frac{8}{\pi^4}\left\{1 - \cos\left(\frac{2\pi}{\lambda}\Delta\right)\right\} \quad (18)$$

Additionally, the equation (16) indicates that the diffraction efficiency of any even order diffracted light is "0", and that the higher the order of the diffracted light is, the smaller the diffraction efficiency of the diffracted light becomes.

Figure 6:
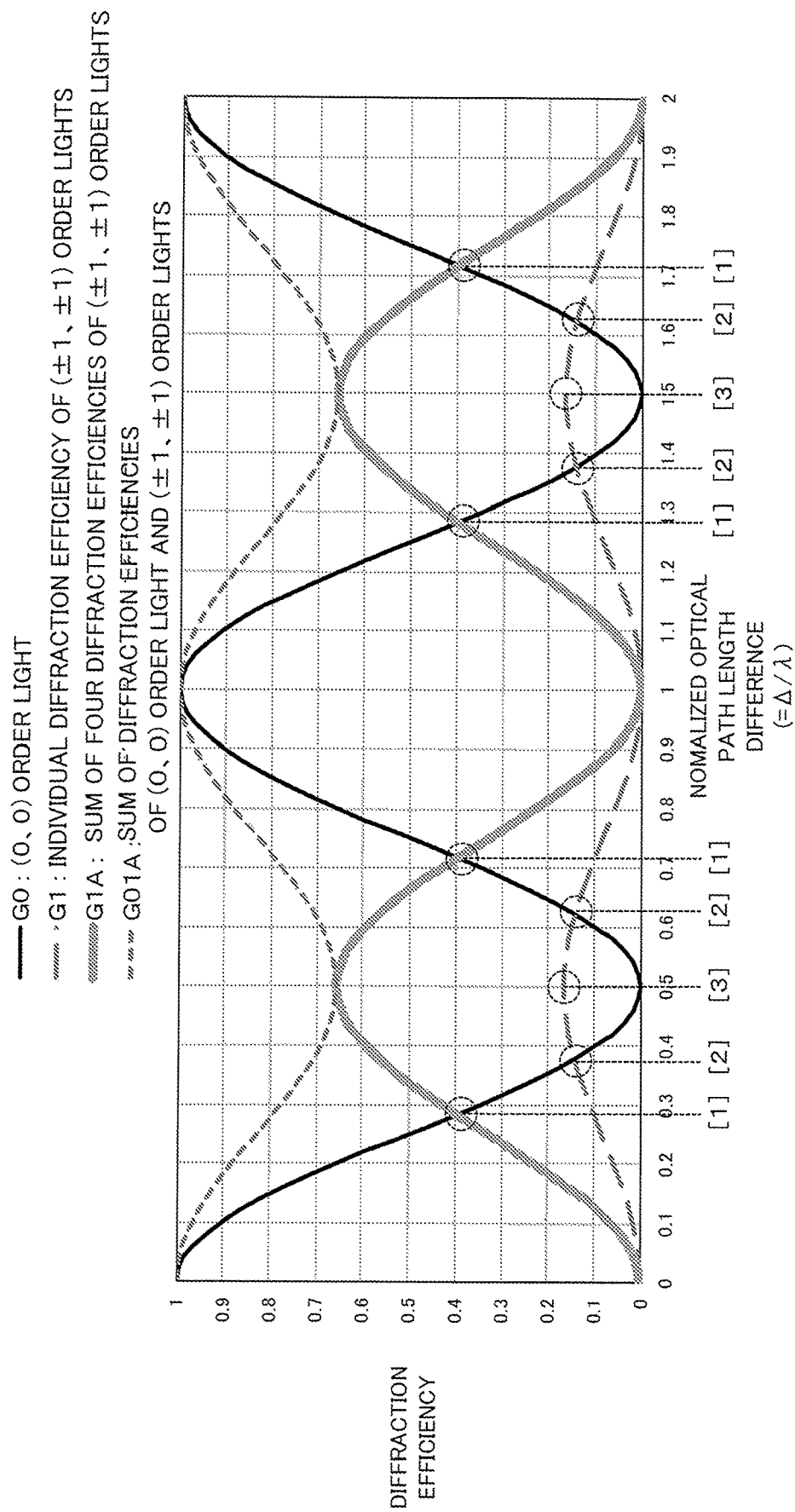
FIG. 6 indicates a relationship between the diffraction efficiency and the optical path length difference.

FIG. 6 indicates the relationship between the diffraction efficiency calculated through the equation (16) and the normalized optical path length difference which is the optical path length difference Δ normalized by being divided by λ. The graph "G0" indicates the diffraction efficiency of the 0th order diffracted light, the graph "G1" indicates the individual diffraction efficiency of the first order diffracted lights, the graph "G1A" indicates the sum of four diffraction efficiencies of the first order diffracted lights, and the graph "G01A" indicates the sum of the diffraction efficiency of the 0th order diffracted light and four diffraction efficiencies of the first order diffracted lights. As illustrated in FIG. 6, when the optical path length difference Δ is equal to "(N±0.283) λ" (see the condition [1]), the diffraction efficiency of each 0th order diffracted light and the total diffraction efficiency of four first order diffracted lights are equal to "0.3965", respectively. The sum of these two diffraction efficiencies is "0.793" and remained minor diffraction efficiency is distributed to higher order diffracted lights which is the third order or an odd order larger than third order. In this case, as explained in FIGS. 4C and 5C, since the first order diffracted lights are irradiated in the four diagonal directions of each 0th order diffracted light, it is possible to suitably fill the clearance between the diffracted lights.

If the optical path length difference Δ is equal to "(N±0.377) λ" (see the condition [2]), the diffraction efficiency of the 0th order diffracted light and the individual diffraction efficiency of the first order diffracted light are equal to "0.141", respectively. The sum of these diffraction efficiencies is "0.705" and remained minor diffraction efficiency is distributed to higher order diffracted lights which is third order or an odd order larger than third order.

If the optical path length difference Δ is equal to "(N±0.5) λ" (see the condition [3]), the diffraction efficiency of the 0th order diffracted light is "0" and the individual diffraction efficiency of four first order diffracted lights is "0.164". The total diffraction efficiency is "0.657" and remained minor diffraction efficiency is distributed to higher order diffracted lights which is third order or an odd order larger than third order.

Figure 7:
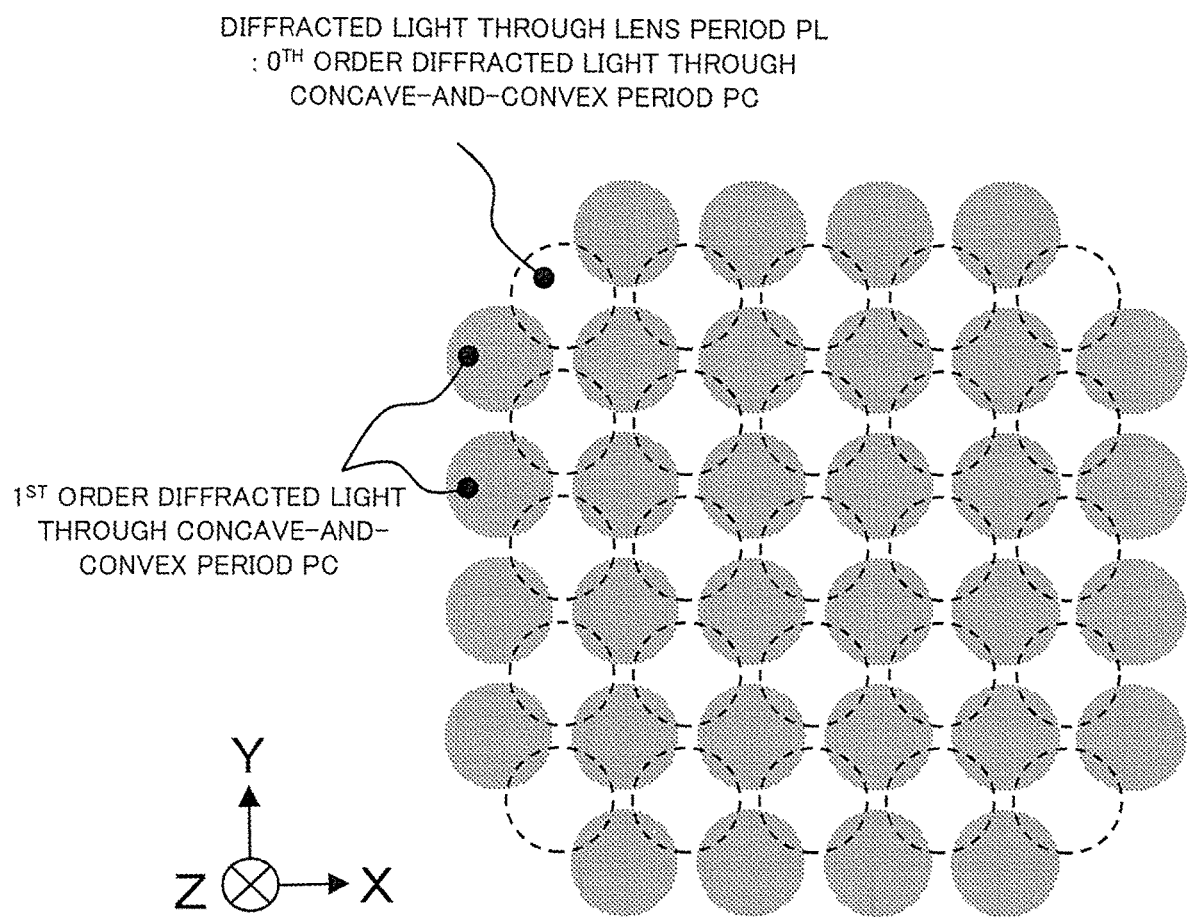
FIG. 7 illustrates the light intensity distribution of diffracted lights in which the optical path length difference is provided.

FIG. 7 illustrates the light intensity distribution of the diffracted light on the standard plane Ptag in a case where the optical path length difference Δ is "(N±0.5) λ".

When the optical path length difference Δ is "(N±0.5) λ", the intensity of the 0th order diffracted light becomes "0". According to the example illustrated in FIG. 7, the standard plane Ptag is almost-evenly filled by the first order diffracted lights. Meanwhile, when the concave-and-convex period PC is determined to be twice as long as the lens period PL, the diffracted light pitch generated through the concave-and-convex period PC is one-half of the diffracted light pitch generated through the lens period PL. Thus, in this case, the first order diffracted lights generated through the concave-and-convex period PC with respect to each diffracted light generated through the lens period PL overlap with each other. As a result, the number of diffracted lights in appearance is the same as the number in the case where no height difference are provided and the diffracted light pitch is also the same as the diffracted light pitch in the case where no height difference are provided. Thus, this example is not preferable since the irregular brightness due to the clearance between diffracted lights cannot be suppressed. Accordingly, when the concave-and-convex period PC is determined to be twice as long as the lens period PL as with the embodiment, it is preferable to set the optical path length difference Δ to "(N±0.283) λ" thereby to equalize the diffraction efficiency of the 0th order light generated through the concave-and-convex period PC and the total diffraction efficiency of different four first order diffracted light.

(4) Relationship Between Wavelength and Phase Structure

Since the light source unit 1 emits lights with different wavelengths corresponding to R, G and B, such a problem arises that which wavelengths of R, G and B should be selected as the standard for determining the height difference Δ between the lower level microlens 21L and the upper level microlens 21H. The description thereof will be explained.

Generally, the longer the wavelength is, the larger the diffraction angle of the diffracted light generated on the microlens array 20 becomes. Thus, the longer the wavelength is, the wider the diffracted light pitch (see FIG. 5A) becomes. The size of the diffracted light depends on the numerical aperture and does not depend on the wavelength. As a result, the longer the wavelength of the light is, the wider the diffracted light pitch becomes.

Figure 8A:
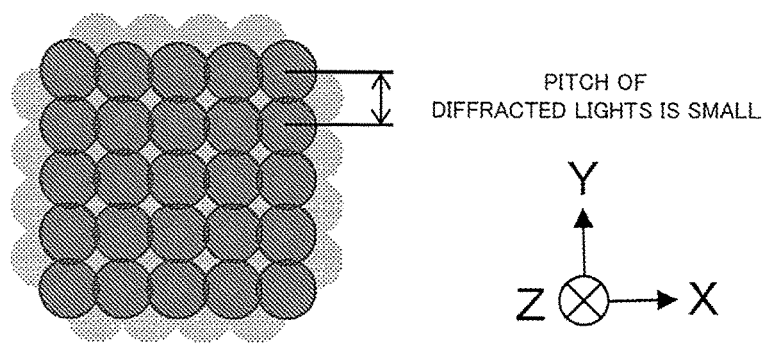
FIGS. 8A to 8C illustrates the light intensity distribution of diffracted lights with respect to each wavelength corresponding to blue, green and red.
Figure 8B:
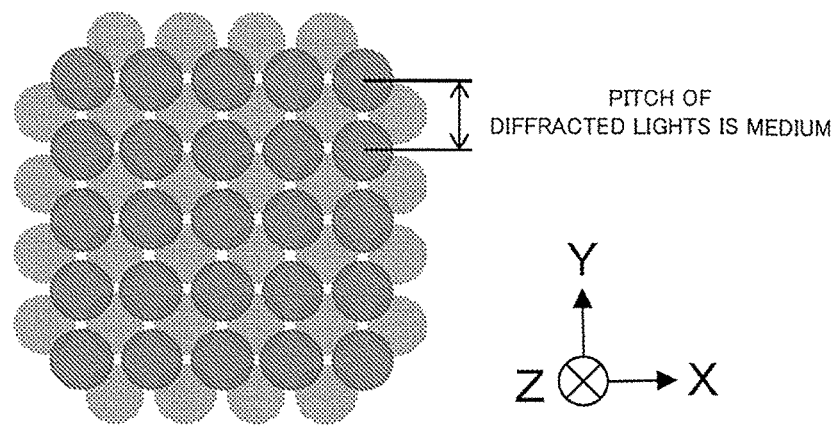
Figure 8C:
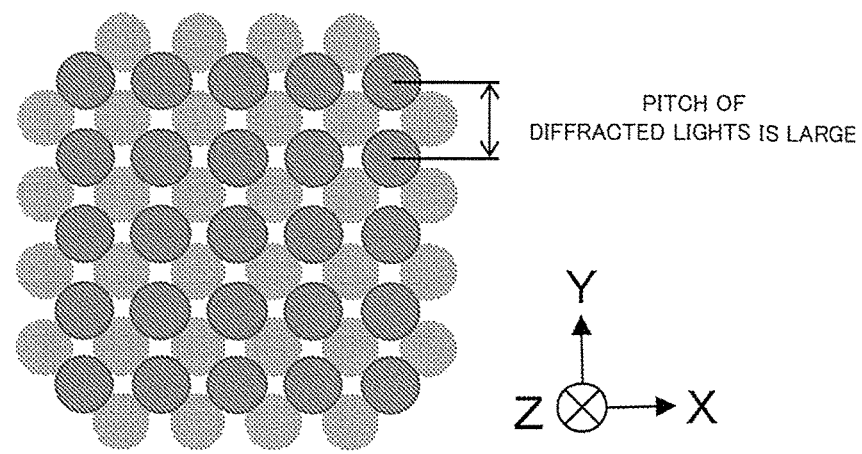

FIG. 8A illustrates the light intensity distribution of the diffracted lights on the standard plane Ptag in the case of blue light (whose wavelength is 435.8 nm), and FIG. 8B illustrates the light intensity distribution of the diffracted lights on the standard plane Ptag in the case of green light (whose wavelength is 546.1 nm). FIG. 8C illustrates the light intensity distribution of the diffracted lights on the standard plane Ptag in the case of red light (whose wavelength is 700 nm). As illustrated in FIGS. 8A to 8C, the diffracted light pitch in the case of the blue light which has the shortest wavelength is the shortest pitch whereas the diffracted light pitch in the case of the red light which has the longest wavelength is the longest pitch.

In consideration of above things, as a first preferable example, the height difference Δ is determined in accordance with the wavelength (i.e., wavelength of red light) which produces the widest diffracted light pitch. This makes it possible to prevent the occurrence of clearance on the light intensity distribution of the diffracted lights regarding each laser light of R, G and B thereby to preferably suppress the irregular brightness.

In contrast, as a second preferable example, in such a case that the diffracted light pitch does not particularly depend on the wavelength, the height difference Δ may be determined in accordance with the wavelength (i.e., wavelength of green light) which produces the maximum luminous sensitivity. As a third preferable example, in consideration of both of the diffracted light pitch and the luminous sensitivity, the height difference Δ may be determined in accordance with the intermediate wavelength between the longest wavelength and the wavelength corresponding to the maximum luminous sensitivity.

A description will be given of a method for determining the integer N which defines the height difference (optical path length difference) Δ. The larger the integer N is, the larger the height difference Δ becomes. Besides, the definition of the diffraction efficiency expressed by the equation (16) indicates that the larger the height difference Δ is, the more the ratio between the 0th order diffracted light and the first order diffracted light with respect to each of R, G and B varies. Namely, the variation of the diffraction efficiency along with the variation of the wavelength increases with increasing height difference Δ. In consideration of above things, it is preferable to set the integer N to "0" or "1" and make the height difference Δ possibly short.

As described above, the microlens array 20 of the screen 2 according to the embodiment includes upper-level microlenses 21H and lower-level microlenses 21L which are formed on the incidence surface of the screen 2, which have the same effective diameter, and which have a structure that generates an optical path length difference Δ in transmission light. By disposing the upper-level microlenses 21H and the lower-level microlenses 21L at an interval based on the effective diameter, the basic periodic structure of a lens period PL is formed. Further, the upper-level microlens 21H and the lower-level microlens 21L form a basic block including a combination of the lenses having a structure that generates the optical path length difference. A concave-and-convex period PC based on the basic block is an integer multiple of the lens period PL. This configuration enables the microlens array 20 to suitably suppress the irregular brightness while preventing deterioration of the resolution due to different effective diameters of lenses.

[Modification]

Hereinafter, a description will be given of preferred modifications of the embodiment. Each modification to be mentioned later can be applied to the above-mentioned embodiment in combination.

(First Modification)

According to the front view of the screen 2 illustrated in FIG. 3A, a lower level microlens 21L and an upper level microlens 21H are alternatively arranged one by one. Instead, a predetermined number of lower level microlenses 21L and upper level microlenses 21H may be alternatively arranged.

FIG. 9A illustrates a side view of the screen 2A on the X-Y plane according to the modification. FIG. 9B illustrates a front view of the screen 2A wherein each upper level microlens 21H is indicated by "HIGH" and each lower level microlens 21L is indicated by "LOW". FIG. 9C illustrates a basic block of the microlens array 20 in the example illustrated in FIGS. 9A and 9B.

According to FIG. 9A, the upper level microlenses 21H and the lower level microlenses 21L are arranged by a block which has two columns and two rows, and each block is arranged in zigzag. Furthermore, as with the basic blocks of the embodiment, the basic blocks illustrated in FIG. 9C are asymmetric with respect to the X axis and the Y axis and symmetric with respect to the center. The concave-and-convex period PC in this case is four multiple, that is an integer multiple, of the lens period PL as illustrated in FIG. 9A. Thus, as with the screen 2, the screen 2A can suitably generate each diffracted light whose diffraction angle is smaller than the diffraction angle of each diffracted light generated by the microlens array 20.

Next, with reference to FIGS. 10A to 10D and FIGS. 11A and 11B, a description will be given of reasons why the first modification is preferable.

Figure 10A:
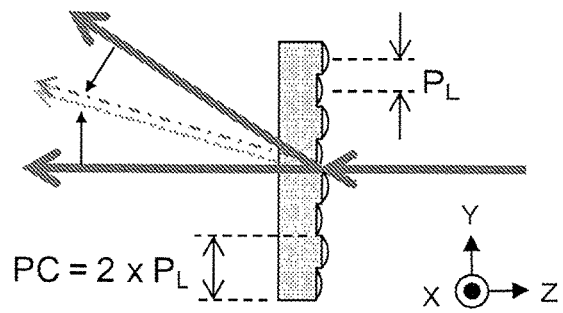
FIGS. 10A to 10D illustrate a relationship between the configuration of the screen and the diffracted lights on the Y-Z plane.
Figure 11A:
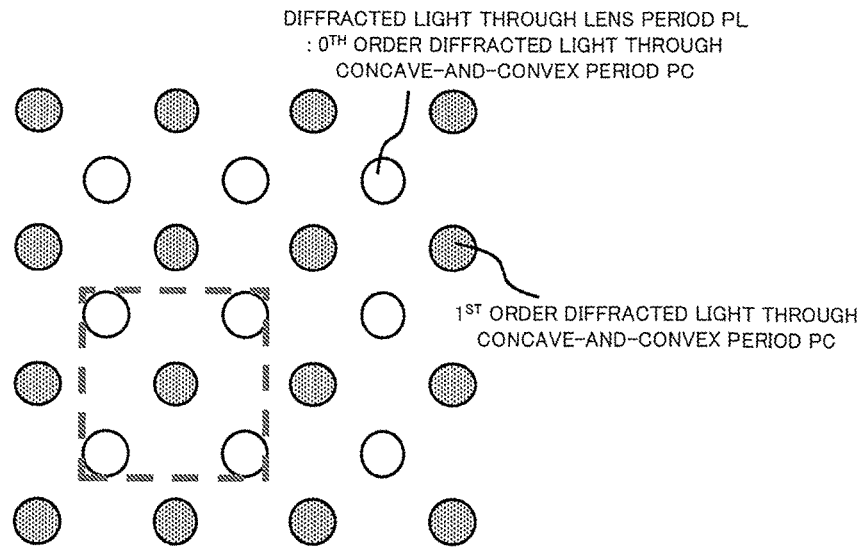
FIGS. 11A and 11B illustrate a light intensity distribution of the diffracted lights according to the first modification.
Figure 11B:
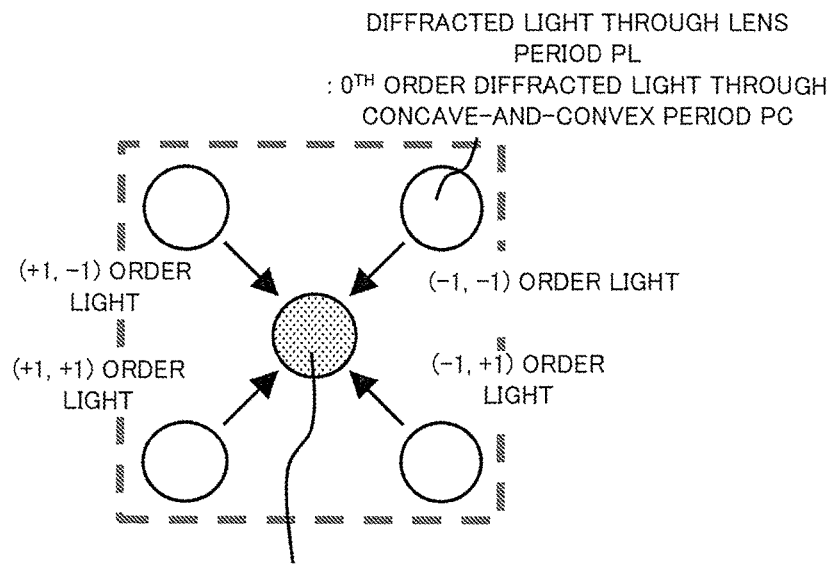

FIG. 10A illustrates diffracted lights on the Y-Z plane according to the embodiment, wherein the height differences on the microlens array 20 are provided by using the concave-and-convex period PC which is twice as long as the lens period PL. FIG. 11A indicates the light intensity distribution of diffracted lights on the standard plane Ptag. In this case, the first order diffracted lights generated through the concave-and-convex period PC are positioned in between diffracted lights which are generated through the lens period PL thereby to fill the clearance between the beams and reduce the irregular brightness. In this case, however, as illustrated in FIG. 11B, the first order diffracted lights generated through the concave-and-convex period PC corresponding to a diffracted light which is generated through the lens period PL overlap with the first order diffracted lights corresponding to the neighboring diffracted light which is generated through the lens period PL. Thus, the number of the diffracted lights is apparently reduced although four first order diffracted lights, (+1, +1) order light, (+1, −1) order light, (−1, −1) order light and (−1, +1) order light, should be originally generated though the concave-and-convex period PC with respect to each diffracted light generated through the lens period PL. This leads to reduction of such an effect that the light intensity distribution on the standard plane Ptag evenly spreads by disposing the diffracted lights as many as possible. In order to prevent the first order diffracted lights generated through the concave-and-convex period PC from overlapping with each other, it is preferable to make the concave-and-convex period PC three times or larger than three time as long as the lens period PL thereby to limit the diffraction angle of each first order diffracted light to at most one third of the angular interval of diffracted lights generated through the lens period PL.

In consideration of these agendas, according to the first modification, the height difference is provided by using the concave-and-convex period PC which is four times period of the lens period PL so that all possible diffracted lights are arranged on the standard plane Ptag.

Figure 10B:
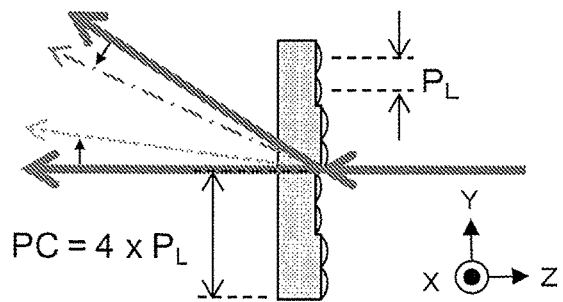
Figure 12A:
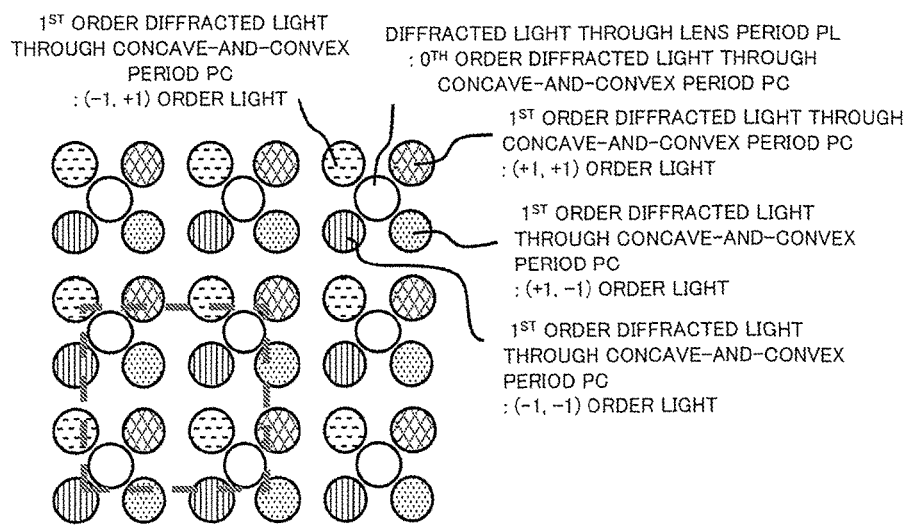
FIGS. 12A and 12B illustrate a light intensity distribution of the diffracted lights according to the first modification.
Figure 12B:
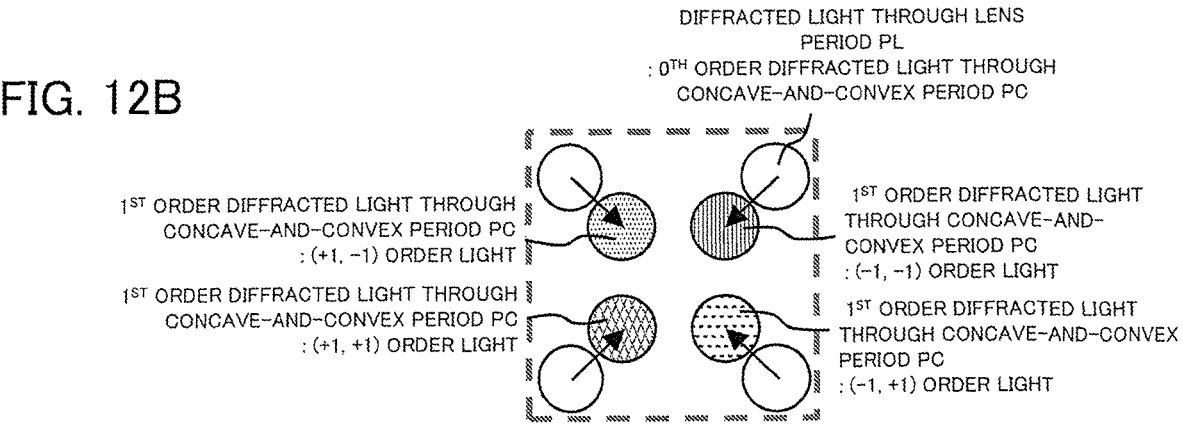

FIG. 10B illustrates diffracted lights on the Y-Z plane wherein the height difference is provided by using the concave-and-convex period PC which is four times period of the lens period PL. FIG. 12A indicates the light intensity distribution of the diffracted lights on the standard plane Ptag in the case of FIG. 10B. In this case, as illustrated in FIG. 12B, it is possible to differentiate each position of the first order diffracted lights which are generated through the concave-and-convex period PC and which are generated from diffracted lights of the lens period PL lying next to each other. This case is preferable in that all possible diffracted lights are arranged on the standard plane Ptag.

Figure 10C:
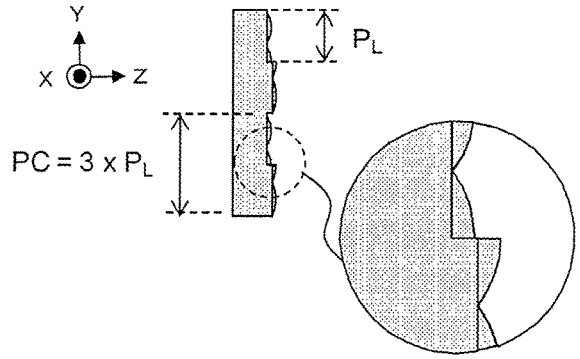
Figure 13:
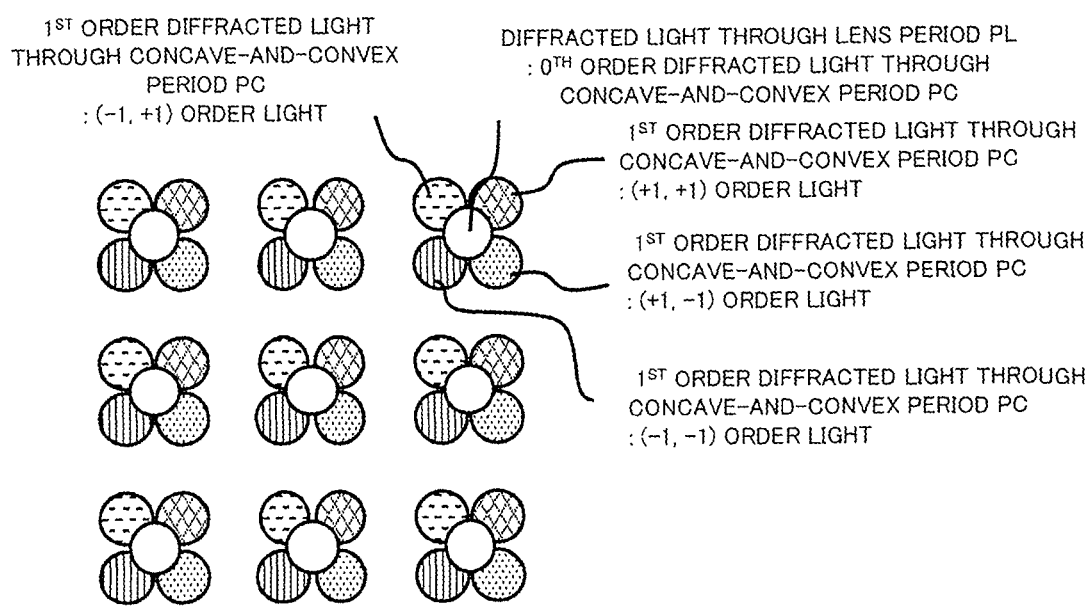
FIG. 13 illustrates a light intensity distribution of the diffracted lights according to the first modification.

Here, a description will be given of the reason why it is preferable to provide the concave-and-convex period PC which is four times period of the lens period PL. In order to reduce the irregular brightness, it is desirable that the light intensities of all the first order lights generated through the concave-and-convex period PC should be equal. To achieve this, it is preferable that the area of the lower level part should be the same size as the area of the higher level part. Here, if the concave-and-convex period PC is designed to be an odd multiple period of the concave-and-convex period PC, the height difference lies inside the lens surface as illustrated in FIG. 10C. A lens with a height difference is not preferable in that the difference of characteristics, which causes irregular brightness, between a lens with a height difference and a lens without any height difference is generated due to sagging of the height difference and manufacturing errors. In other words, the concave-and-convex period PC according to the first modification should be determined to be four times as long as the lens period PL in consideration of the above-mentioned necessary conditions that the concave-and-convex period PC should be an even times period of the lens period PL and that the concave-and-convex period PC should be three times or larger than three times as long as the lens period PL as mentioned above. This enables the height difference not to lie inside the lens surface while enabling the first order diffracted lights generated through the concave-and-convex period PC and not to overlap with each other at the same position. It is noted that the concave-and-convex period PC determined to six multiple or eight multiple of the lens period PL also produces a similar effect. In this case, however, as illustrated in FIG. 13, the first order diffracted lights generated due to the concave-and-convex period PC arise in such a state that they are adjacent to the diffracted light generated through the lens period PL. This leads to unevenness of the pitch of diffracted lights when whole diffracted lights are observed. Thus, preferably, the concave-and-convex period PC is designed to be four times as long as the lens period PL. Additionally, it is desirable that the optical path length difference Δ generated through the height difference should be determined in accordance with the lens period PL and the converging angle α of light projected from the light source unit 1.

In such a case that the lens period PL should be small and/or the converging angle α of light projected from the light source unit 1 should be relatively small, it is preferable for the optical path length difference Δ generated through the height difference to be determined to "N±0.377λ" (see the condition [2] in FIG. 6). In this case, both of the diffraction efficiency of a 0th order diffracted light generated through the concave-and-convex period PC and each diffraction efficiency of the first order diffracted lights corresponding thereto are equal to "0.141". Thus, this case is preferable in that all diffracted lights with the same intensity can be possibly arranged by use of the 0th order diffracted light and the first order diffracted lights.

Figure 10D:
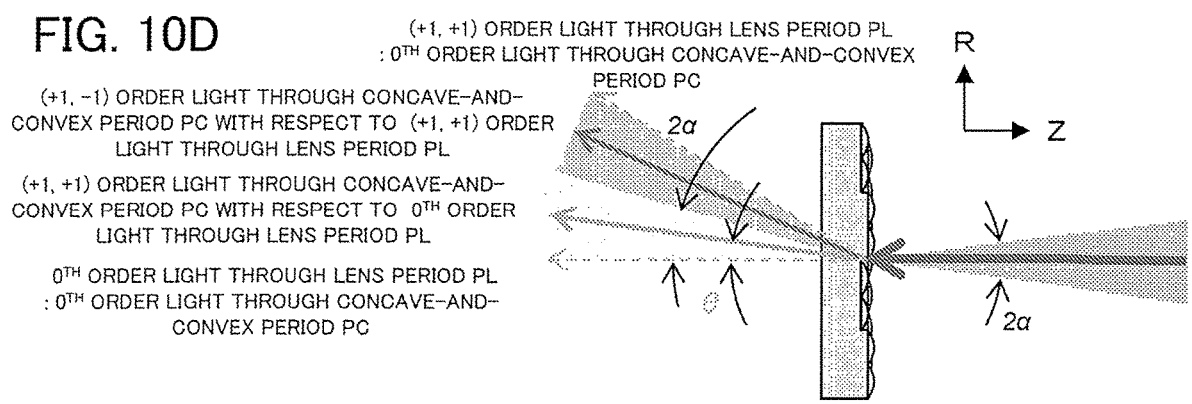

Furthermore, there are preferred examples in such a case that the lens period PL can be determined to be relatively large and/or that the converging angle α of the light projected from the light source unit 1 can be determined to be relatively large. For the sake of explanation, the origin O indicates the intersection of the X axis and the Y axis, and "R axis" indicates the direction of the (+1, +1) order light and the (−1, −1) order light with respect to the center of a 0th order light generated through the concave-and-convex period PC, and the positive direction of the R axis coincides with the direction of the (+1, +1) order light. Similarly, "S axis" indicates the direction of the (−1, +1) order light and the (+1, −1) order light and the positive direction of the S axis coincides with the direction of the (−1, +1) order light. FIG. 10D illustrates diffracted lights on the R—Z plane at the time when the converging angle α of the light source unit 1 is determined to be relatively large so that the maximum length of clearance between diffracted lights becomes zero, and FIG. 14A indicates the light intensity distribution on the standard plane Ptag in the case of FIG. 10(D).

Figure 14A:
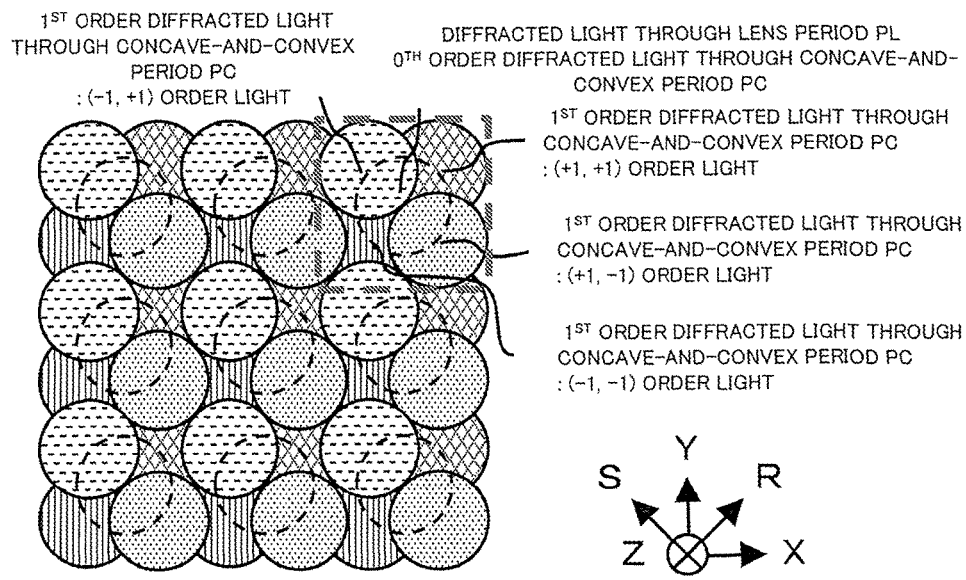
FIGS. 14A and 14B illustrate a light intensity distribution of the diffracted lights according to the first modification.
Figure 14B:
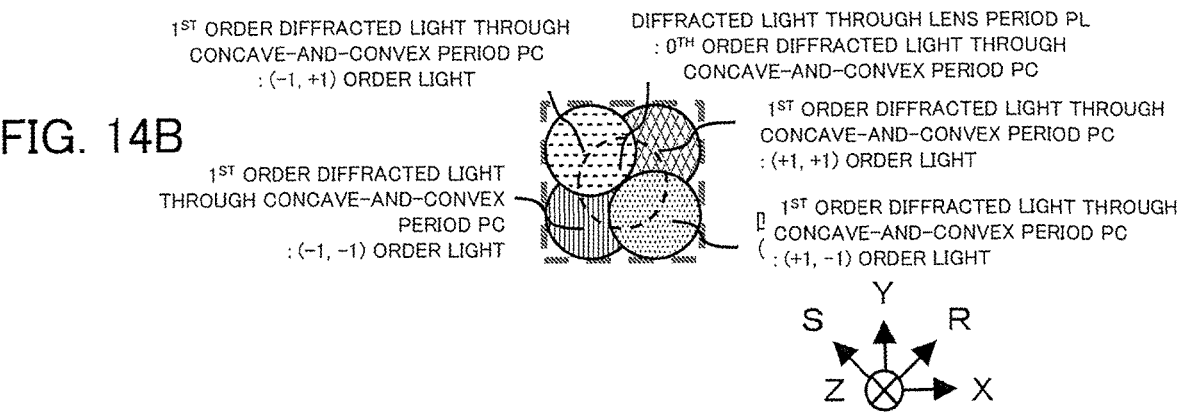

FIG. 14B illustrates four first order diffracted lights generated through the concave-and-convex period PC with respect to one diffracted light generated through the lens period PL. According to FIG. 14A, in order not to generate any clearance between four first order diffracted lights, the converging angle of the light source unit 1 is determined so that the two first order diffracted lights arranged in the R axis direction are adjacent to each other and the two first order diffracted lights arranged in the S axis direction are adjacent to each other. Through the configuration designed as mentioned above, it is possible to eliminate non-irradiated areas on the standard plane Ptag.

As illustrated in FIG. 14B, since the width of a plurality of beams formed by four first order diffracted lights in the R axis or in the S axis direction is just twice the size of the diffracted light generated through the lens period PL, it can be seen that the relationship indicated by the following equation (19) is satisfied.

$$\sin\alpha = \frac{\lambda}{4}\sqrt{\left(\frac{1}{P_{Lx}}\right)^2 + \left(\frac{1}{P_{Ly}}\right)^2} \quad (19)$$

In this case, the optical path length difference Δ generated through the height difference is set to "N±0.5λ" (see the condition [3] in FIG. 6) so that the diffraction efficiency of the 0th order diffracted light generated through the concave-and-convex period PC becomes zero and that the 0th order diffracted light is therefore eliminated as illustrated in FIGS. 14A and 14B. This case is more preferable since the first order diffracted lights are evenly arranged and that non-irradiated areas are eliminated.

The above explanation is true of such a case that a phase structure is incorporated by any means other than making any height difference.

(Second Modification)

The microlenses 21 is determined to have two levels of height in the Z axis. Instead, the microlenses 21 may be determined to have three or more than three level of height in the Z axis.

Figure 15A:
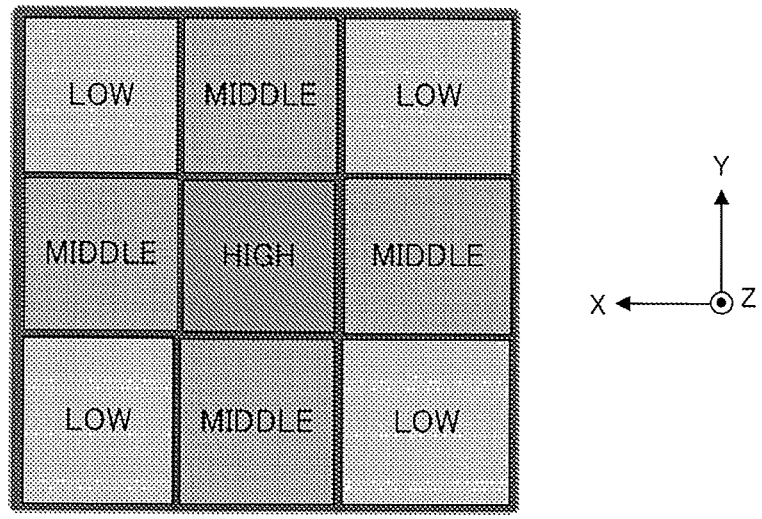
FIGS. 15A and 15B illustrate the configurations of the screens according to the second modification.

FIG. 15A illustrates a basic block in a case where the height of the microlenses 21 in the Z axis is determined to have three levels. In FIG. 15A, each area with a notation "HIGH" indicates a microlense 21 with the highest level of height in the Z axis direction, and each area with a notation "LOW" indicates a microlense 21 with the lowest level of height in the Z axis direction and each area with a notation "MIDLLE" indicates a microlense 21 with the secondary highest (i.e., secondary lowest) level of height in the Z axis direction. According to this basic block, the concave-and-convex period PC is three times, that is an integer multiple, as long as the lens period PL. Thus, at the time of having the basic block illustrated in FIG. 15A, the screen 2 can also suitably produce each diffracted light whose diffraction angle is smaller than the diffraction angle of each diffracted light generated by the microlens array 20.

Figure 15B:
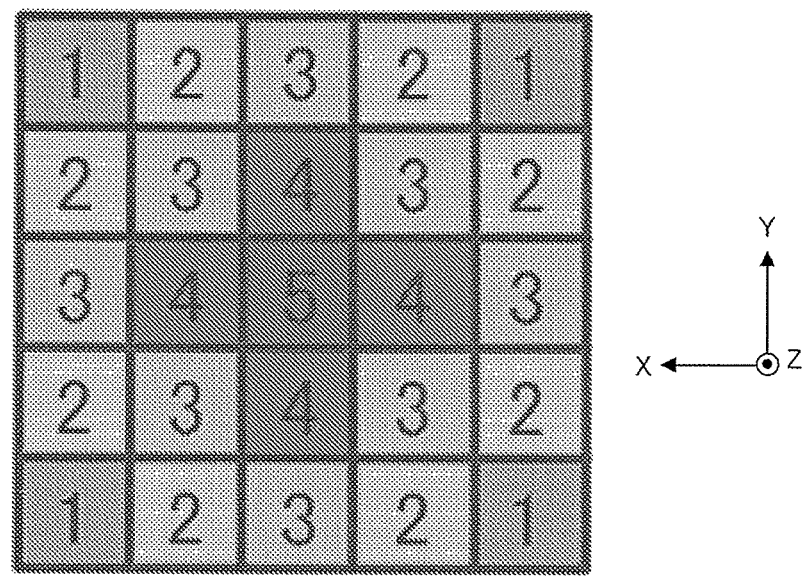

FIG. 15B illustrates an example of a basic block in a case where the microlenses 21 are designed to have five levels of height in the Z axis. In FIG. 15B, the height of each microlense 21 in the Z axis is indicated by any one of "1" to "5". According to this basic block, the concave-and-convex period PC is five times, that is an integer multiple, as long as the lens period PL. Thus, even at the time of having the basic block illustrated in FIG. 15B, the screen 2 can suitably produce each diffracted light whose diffraction angle is smaller than the diffraction angle of each diffracted light generated by the microlens array 20.

(Third Modification)

Instead of providing the concave-and-convex period PC which is an integer multiple of the lens period PL through the height difference of the microlenses 21, the concave-and-convex period PC which is an integer multiple of the lens period PL may be provided through the difference of the curvature radii of the microlenses 21.

FIG. 16A illustrates a side view of the screen 2B according to the third modification on the X-Y plane. As illustrated in FIG. 16A, in this example, the microlens array 20B on which microlenses 21Ba with a high curvature radius and microlenses 21Bb with a low curvature radius are alternatively arranged is formed on the incident surface of the screen 2B, wherein the effective diameters of the microlenses 21Ba and the microlenses 21Bb are equal. The top position of the microlenses 21Bb is higher than the top position of the microlenses 21Ba. In this case, the concave-and-convex period PC based on the microlenses 21Bb and the microlenses 21Ba is twice as long as the lens period PL.

FIG. 16B illustrates a front view of the screen 2B given that each microlens 21Ba is expressed by "LARGE" and that each microlens 21Bb is expressed by "SMALL". FIG. 16C illustrates the basic block of the microlens array 20B. As illustrated in FIGS. 16B and 16C, in this case, the microlenses 21Ba and the microlenses 21Bb are asymmetrically arranged with respect to each of the X axis and the Y axis. Each basic block is, in the same way as the embodiment, quartered in a cross shape so that diagonally-arranged areas have the same structure and areas adjacent to each other have different structures.

As described above, by forming the concave-and-convex period PC which is an integer multiple of the lens period PL through the microlenses 21Ba and the microlenses 21Bb with different radii, the screen can suitably generate each diffracted light whose diffraction angle is smaller than the diffraction angle of each diffracted light generated by the microlens array 20. Additionally, according to the example in FIGS. 16A to 16C, since any height difference is not provided, it is possible to suitably suppress the loss of the light intensity and the deterioration of the contrast caused by light scatters due to the height difference.

(Fourth Modification)

Instead of the height difference being provided, concave lenses and convex lenses with different signs of curvature may be provided on the mirolens array 20 as the microlenses 21 thereof.

Figure 17A:
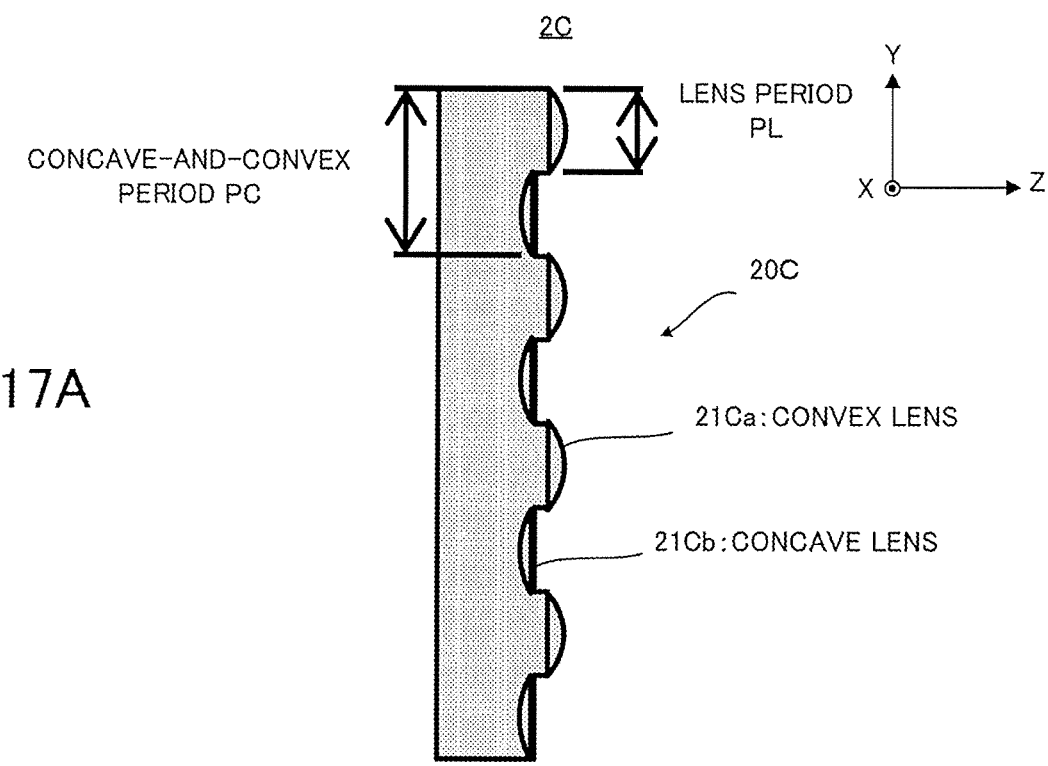
FIGS. 17A to 17C illustrate the configuration of the screen according to the fourth modification.

FIG. 17A illustrates a side view of the screen 2C according to the third modification on the X-Y plane. As illustrated in FIG. 17A, in this case, the microlens array 20C on which the microlenses (convex lenses) 21Ca and the microlenses (concave lenses) 21Cb are alternatively arranged is formed on the incident surface of the screen 2C, wherein the effective diameters of the microlenses 21Ca and the microlenses 21Cb are equal. The top position of the microlenses 210*b* is lower in the Z axis direction than the top position of the microlenses 21Ca. In this case, the concave-and-convex period PC based on the microlenses 21Cb and the microlenses 21Ca is twice as long as the lens period PL.

Figure 17B:
Figure 17C:
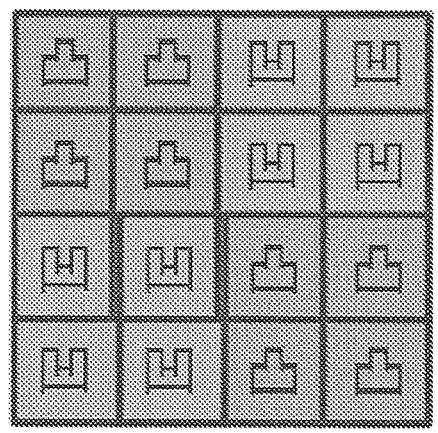

FIG. 17B illustrates a front view of a basic block of the screen 2C given that each microlens 21Ca is expressed by " 凸 " and that each microlens 21Cb is expressed by "凹". FIG. 17C illustrates another basic block of the microlens array 20C. As illustrated in FIGS. 17B and 17C, in this case, the microlenses 21Ca and the microlenses 21Cb are arranged in a staggered arrangement. Each basic block is, in the same way as the embodiment, quartered in a cross shape so that diagonally-arranged areas have the same structures and areas adjacent to each other have different structures.

According to the example illustrated in FIGS. 17A to 17C, the convex lenses 21Ca and the concave lenses 21Cb are arranged in a staggered arrangement to form the concave-and-convex period PC that is an integer multiple of the lens period PL. Even in this case, the screen 2 can suitably produce each diffracted light whose diffraction angle is smaller than the diffraction angle of each diffracted light generated by the microlens array 20. Additionally, since the microlens array 20C according to FIGS. 17A to 17C has no height difference, the loss of the light intensity due to any height difference can be suitably suppressed.

(Fifth Modification)

Plural different phase structures each of which has an integer multiple period of the lens period PL may be incorporated into the microlens array 20.

Figure 18A:
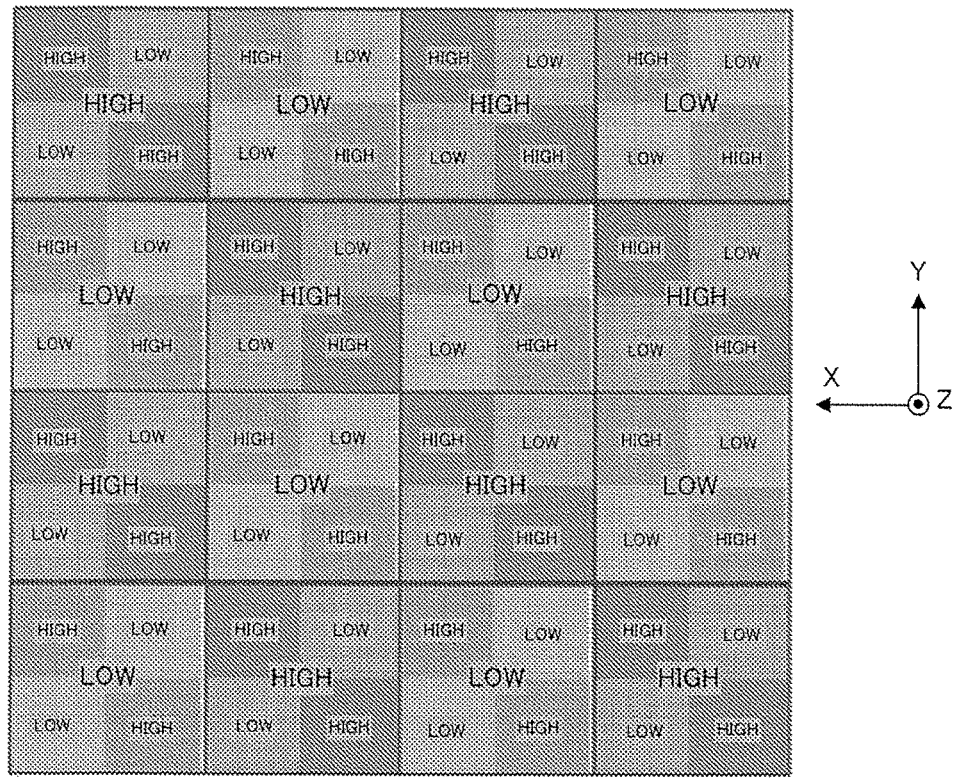
FIGS. 18A and 18B illustrate the configuration of the screen according to the fifth modification.
Figure 18B:
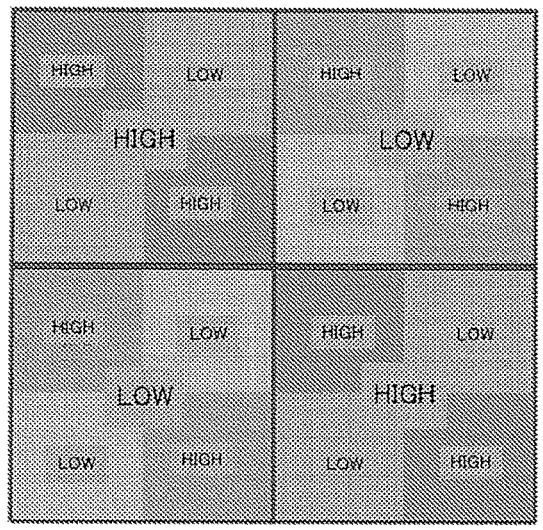

FIG. 18A illustrates a front view of the microlens array 20D into which the twofold phase structures generated through height differences are incorporated. FIG. 18B illustrates the basic block of the microlens array 20D. According to FIGS. 18A and 18B, the basic block of the microlens array 20D has such a phase structure that rectangle areas (referred to as "intermediate blocks") each of which includes four microlenses 21 arranged by two columns and two rows are further arranged by two columns and two rows. Here, each intermediate block is classified into two categories based on the average height of each microlenses 21 in the intermediate block. In FIGS. 18A and 18B, each intermediate block whose average height is high is labeled on its center as "HIGH" and the other intermediate blocks are each labeled on its center as "LOW". Each intermediate block is, in the same way as each basic block in the embodiment, quartered in a cross shape so that diagonally-arranged areas have the same structures and areas adjacent to each other have different structures. When a block composed of four intermediate blocks is deemed as one basic block, each basic block is also quartered in a cross shape so that diagonally-arranged areas have the same structures and areas adjacent to each other have different structures.

In such a configuration, the phase structure of the intermediate blocks divides incident light on the microlens array 20D into a 0th order diffracted light and first order diffracted lights whereas the phase structure of the basic blocks further divides each of these diffracted lights into a 0th order diffracted light and first order diffracted lights. Thus, in this case, even if the pitch of the diffracted lights without consideration of the intermediate blocks and the basic blocks is large, it is possible to suitably fill the clearance of the light intensity distribution of diffracted lights on the standard plane Ptag by generating diffracted lights based on the intermediate blocks and the basic blocks.

It is noted that such an intermediate block and a basic block as mentioned above may be formed based only on the height difference structure of the microlenses 21 or formed based on difference of curvature radii according to the third modification or the fourth modification.

(Sixth Modification)

Instead of being formed on the incident surface of the screen 2, the microlens array 20 may be formed on the surface opposite to the incident surface of the screen 2 or may be formed on the both sides of the screen 2.

(Seventh Modification)

Figure 19A:
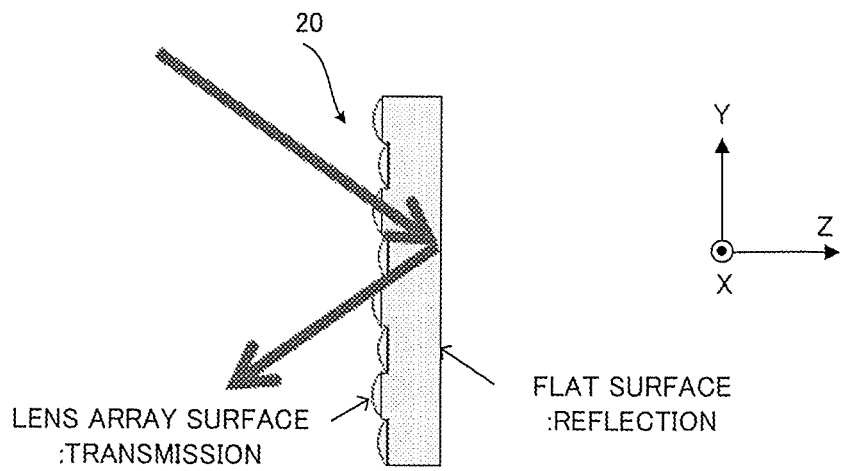
FIGS. 19A to 19C illustrate the configurations of the screens according to the seventh, eighth and ninth modifications.

The microlens array 20 may be a reflect-type lens array as illustrated in FIG. 19A, wherein the reflection coating is applied to the surface of the microlens array 20 opposite to the lens array surface.

(Eighth Modification)

Figure 19B:
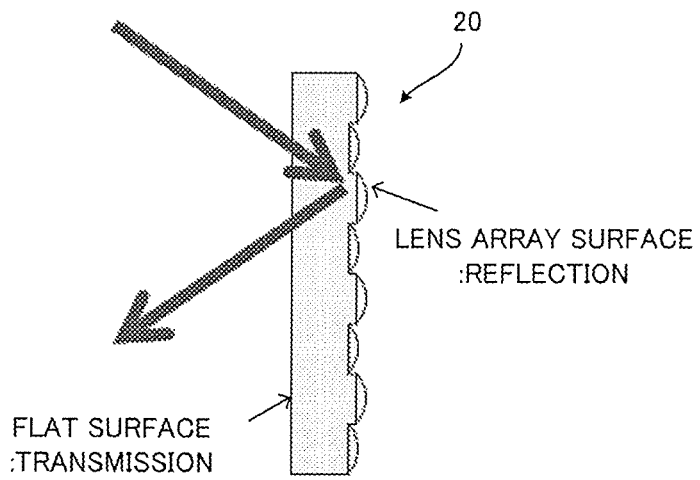

In such a configuration according to the seventh modification, the light passes through the lens surface twice. Additionally, when it is a reflective lens array and a light is diagonally incident to the lenses, the difference occurs between the position on the lens surface which the light firstly passes through and the position on the lens surface which the light after the reflection passes through. This case is not preferable in that moire fringes arise as with the case where the light passes through two microlens arrays with a position gap. Thus, the microlens array 20 according to the eighth modification, as illustrated in FIG. 19B, is configured to have the lens array surface to which the reflection coating is applied and the opposite surface to which the antireflection coating is applied. In this case, since the light is reflected by the lens surface itself, the light receives the periodical phase modulation of the lens array only once as with the case of the transparent type lens array. This leads to a preferable result since the moire fringes which cause a problem in the seventh modification can be suppressed. In such a configuration according to the eighth modification, stains adhered to the exposed lens surface do not affect the light whereas it is difficult to remove the stains adhered to a lens surface with a concave and convex shape. Thus, the above configuration is preferable in that image degradation due to stains can be suppressed.

(Ninth Modification)

Figure 19C:
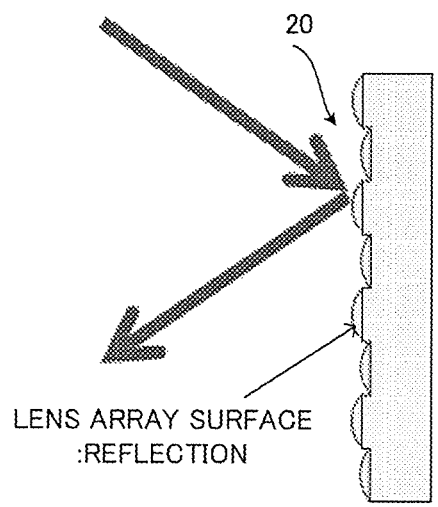

As illustrated in FIG. 19C, the reflection coating is applied on the lens surface of the microlens array 20 according to the ninth modification and the lens surface is directed to the light side. In such a configuration, the light does not pass through the inside of the lens surface, which suitably suppresses the loss of the light intensity due to absorption by the material as well as the image deterioration due to birefringence of the material and the irregular transmittance. Furthermore, the configuration does not need any antireflection coating on the opposite side of the surface, which preferably reduces the component cost. Since this opposite side of the surface does not affect the performance of the lens array, it does not need a high surface accuracy which is needed for a general optical element. This suitably moderates the difficulty of component manufacturing. Furthermore, since this configuration have a high flexibility regarding the shape, the layout in accordance with the shapes of peripheral components can be possible. This suitably leads to a high flexibility of designing the shapes of the components.

Figure 1B:
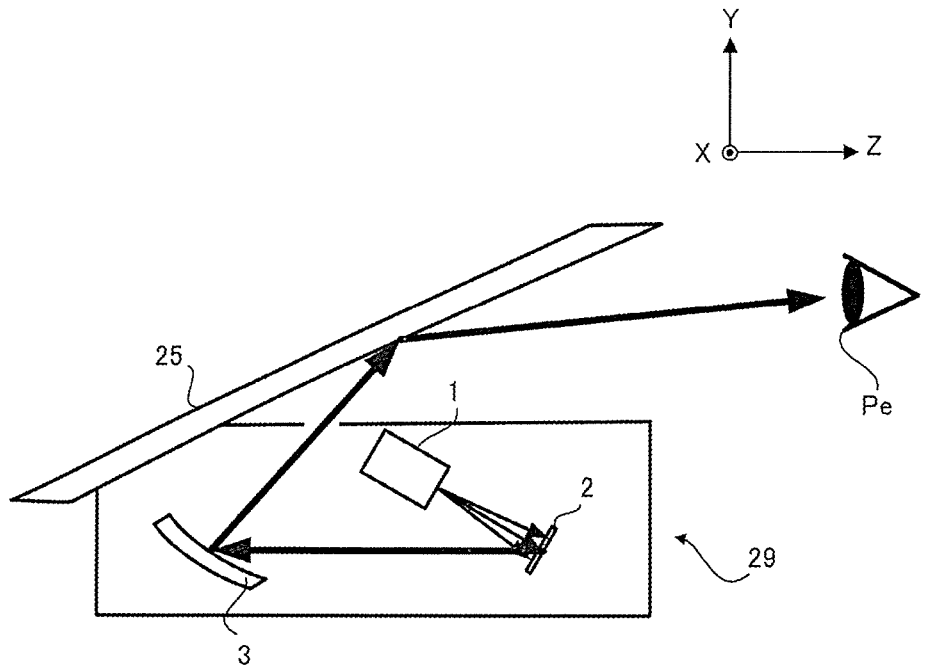

For example, the microlens array 20 according to the sixth to ninth modifications can be used as the screen 2 of the head-up display illustrated in FIG. 1B.

DESCRIPTION OF REFERENCE NUMBERS

1 Light source unit
2 Screen
3 Concave mirror
20, 20A to 20D Microlens array
21 Microlens

What is claimed is:

1. A lens array irradiated with a laser light, the lens array comprising:
   each of lenses arranged to form a first periodic structure such that plural sets of the lenses are combined to form respective blocks each having a structure that provides an optical path length difference of the laser light,
   wherein each of the blocks is arranged in a repeating pattern to form a second periodic structure having a period longer than a period of the first periodic structure
   wherein the period of the second periodic structure is an integer multiple of the period of a basic periodic structure, and
   wherein the lenses provide the optical path length difference based on a difference of signs of curvatures between ones of the lenses.

2. The lens array according to claim 1, wherein each of the blocks includes first lenses and second lenses combined in a grid pattern and the first lenses having a staggered arrangement with respect to the second lenses.

3. The lens array according to claim 1, wherein the period of the second periodic structure is four times as long as the period of the first periodic structure.

4. The lens array according to claim 1, wherein each of the blocks is formed by a part of the lenses that are combined in a grid pattern and include at least three kinds of lenses, to provide the optical path length difference.

5. The lens array according to claim 1, for the laser light comprising laser lights emitted by at least one laser light source, the optical path length difference is determined based on a longest wavelength out of respective wavelengths of the laser lights.

6. The lens array according to claim 1, wherein, for the laser light comprising laser lights emitted by at least one laser light source, the optical path length difference is determined based on a wavelength having a highest luminous sensitivity out of respective wavelengths of the laser lights.

7. The lens array according to claim 1, wherein, for the laser light comprising laser lights emitted by at least one laser light source, the optical path length difference is based on a wavelength between a longest wavelength and a wavelength having a highest luminous sensitivity of the respective wavelengths of the laser lights.

8. The lens array according to claim 1, wherein numerical apertures of each of the lenses are substantially equal to one another.

9. The lens array according to claim 1, wherein the lens array comprises a reflective lens array with a lens array surface having a reflection coating.

10. An image projection device equipped with the lens array according to claim 1, wherein the image projection device comprises at least one laser light source that is configured to emit the laser light.

11. The lens array of claim 1, wherein the laser light is modulated based on at least one image signal.

12. The lens array of claim 1, wherein each of the lenses is configured to have a common effective diameter arranged at an interval based on the common effective diameter, to form the first periodic structure.

13. The lens array of claim 1, wherein each of the blocks provides the optical path length difference of the laser light, wherein the laser light is emitted as transmission light or as reflective light.

14. The lens array of claim 1, wherein the period of the second periodic structure is an integer multiple of the period of the first periodic structure.

15. The lens array according to claim 1, wherein the optical path length difference is a shortest optical path length or a second shortest optical path length for which a diffracted light of the lens array is generated by the laser light passing through the blocks or is reflected by the blocks so as to meet a diffraction condition.

16. A lens array comprising:
   lenses arranged to form a first periodic structure such that plural sets of the lenses are combined to form respective blocks each having a structure that is configured to provide an optical path length difference in response to a received laser light, wherein each of the blocks is arranged regularly and repeatedly, and wherein the lenses provide the optical path length difference based on a difference of signs of curvatures between ones of the lenses.

17. The lens array according to claim 16, wherein each of the blocks includes first lenses and second lenses combined in a grid pattern, and the first lenses have a staggered arrangement with respect to the second lenses.

18. The lens array according to claim 16, wherein the blocks form a second periodic structure having a period longer than a period of the first periodic structure, and wherein the period of the second periodic structure is four times as long as the period of the first periodic structure.

19. The lens array according to claim 16, wherein each of the blocks is formed by a part of the lenses that are combined in a grid pattern and include at least three kinds of lenses, to provide the optical path length difference.

* * * * *